US010310890B2

(12) United States Patent
Matsumoto

(10) Patent No.: US 10,310,890 B2
(45) Date of Patent: Jun. 4, 2019

(54) CONTROL METHOD FOR VIRTUAL MACHINE SYSTEM, AND VIRTUAL MACHINE SYSTEM

(71) Applicant: Hitachi, Ltd., Tokyo (JP)

(72) Inventor: Shuuhei Matsumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 15/505,748

(22) PCT Filed: Nov. 28, 2014

(86) PCT No.: PCT/JP2014/081588
§ 371 (c)(1),
(2) Date: Feb. 22, 2017

(87) PCT Pub. No.: WO2016/084237
PCT Pub. Date: Jun. 2, 2016

(65) Prior Publication Data
US 2017/0286152 A1 Oct. 5, 2017

(51) Int. Cl.
*G06F 9/48* (2006.01)
*G06F 9/46* (2006.01)
*G06F 9/50* (2006.01)
*G06F 9/455* (2018.01)
*G06F 1/14* (2006.01)

(52) U.S. Cl.
CPC ............... *G06F 9/48* (2013.01); *G06F 1/14* (2013.01); *G06F 9/45558* (2013.01); *G06F 9/46* (2013.01); *G06F 9/485* (2013.01); *G06F 9/4825* (2013.01); *G06F 9/50* (2013.01); *G06F 2009/45575* (2013.01)

(58) Field of Classification Search
None
See application file for complete search history.

(56) References Cited

U.S. PATENT DOCUMENTS

| 7,475,002 | B1 | 1/2009 | Mann |
| 7,707,578 | B1 | 4/2010 | Zedlewski et al. |
| 8,489,699 | B2 | 7/2013 | Goggin et al. |
| 8,533,709 | B2 | 9/2013 | Nicholas et al. |
| 2008/0172666 | A1 | 7/2008 | Inoue |

FOREIGN PATENT DOCUMENTS

JP 2008-171293 A 7/2008

OTHER PUBLICATIONS

International Search Report of PCT/JP2014/081588 dated Mar. 10, 2015.

*Primary Examiner* — Wynuel S Aquino
(74) *Attorney, Agent, or Firm* — Mattingly & Malur, PC

(57) ABSTRACT

The virtual machine system according to the present invention comprises: physical processors which each include an interrupt controller including an interrupt timer; and a virtualization unit which allocates computer resources including the physical processors and physical memories to a plurality of virtual machines. The virtualization unit allocates, to the plurality of virtual machines, virtual processors that are created by virtualizing the physical processors, sets one of the physical processors into either a shared processor mode or an exclusive processor mode, and then sets the interrupt timer of the physical processor that has been set into either the shared processor mode or the exclusive processor mode, into either a shared timer mode or an exclusive timer mode.

14 Claims, 16 Drawing Sheets

CONTROL METHOD FOR VIRTUAL MACHINE SYSTEM, AND VIRTUAL MACHINE SYSTEM

BACKGROUND

This invention relates to a virtual machine system configured to exclusively dynamically allocate an interrupt timer of a physical CPU to a virtual CPU.

There have been increases in the number of CPU sockets mounted to a computer and the number of CPU cores for each of the CPU sockets. A virtual machine system is available as one of methods of effectively using a computer with such an increased number of CPU cores. The virtual machine system is a platform that enables a virtual machine monitor (or hypervisor) to build a plurality of virtual machines through use of resources included in a physical computer, and enables an operating system to operate independently on each of the virtual machines. Employment of the virtual machine system has become widespread because of advantages that the resources of the physical computer can be effectively utilized, the management and maintenance of software can be facilitated, and the like. A program operating on the virtual machine is specifically referred to as "guest", and the virtual machine system (for example, virtual machine monitor) is specifically referred to as "host".

In the virtual machine system, the virtual machine monitor has a shared CPU mode and an exclusive CPU mode as a scheduling mode for the physical CPU. When a small number of physical CPUs of the physical computer were used, it was often the case that the shared CPU mode that allows time-sharing of the physical CPUs by virtual CPUs was used. However, as the number of physical CPUs of the physical computer or the number of CPU cores increases, the exclusive CPU mode that allows each virtual CPU to occupy one specific physical CPU core has become more widespread. The exclusive CPU mode has begun to be used for applications having a strict latency (processing latency) requirement, specifically, an in-memory database, real-time control, and the like.

Those applications frequently use an interrupt timer of a CPU. The interrupt timer of a CPU herein represents a timer included in an interrupt controller built into a CPU motherboard. The timer includes a remaining-time counter configured to decrement a value at a fixed frequency, and has an interval timer function of causing the remaining-time counter to start the decrementing when a value is written to the remaining-time counter and causing the interrupt controller to generate a timer interrupt in the CPU to which the interrupt controller belongs when the value becomes zero and to stop the operation until the next value is written to the remaining-time counter.

In JP 2008-171293 A, there is described a basic method of virtually achieving a timer for a virtual machine through sharing of a timer of a physical computer in a virtual machine system.

In U.S. Pat. No. 7,475,002 B2 and U.S. Pat. No. 8,533,709 B2, there are disclosed methods of virtualizing a timer for catching up with an actual time when a timer of a virtual machine lags behind an actual time in a virtual machine system.

In U.S. Pat. No. 7,707,578 B2, there is disclosed a method of scheduling context to a specific CPU based on how a memory or a cache is accessed.

In U.S. Pat. No. 8,489,699 B2, there is disclosed a method of migrating an I/O exclusively allocated to a virtual machine to be migrated when the virtual machine is migrated between physical computers.

SUMMARY

However, in such related-art virtual machine systems as described in JP 2008-171293 A and disclosed in U.S. Pat. No. 7,475,002 B2, U.S. Pat. No. 8,533,709 B2, U.S. Pat. No. 7,707,578 B2, and U.S. Pat. No. 8,489,699 B2, an interrupt timer of a virtual CPU of a virtual machine is emulated through use of an interrupt timer of a physical CPU, but the overhead of the emulation is large, which may affect the operation of the above-mentioned applications.

In other words, according to the above-mentioned related-art virtual machine systems, when a specific physical CPU is occupied to a given virtual CPU, the virtual CPU is allowed to use a hardware resource included in the physical CPU, but the interrupt timer of the physical CPU is not occupied.

Therefore, the interrupt timer of the virtual CPU is emulated through the use of the interrupt timer of the physical CPU, but the overhead of the emulation is large, which may affect an application operating on the virtual CPU.

The interrupt timer of the physical CPU is also used to, for example, activate host processing, detect a timeout, and serve as a clock tick timer of a fixed cycle period irrespective of whether or not an application is operating. The interrupt timer not only consumes CPU time but also causes data eviction from a translation lookaside buffer (TLB) or a cache, which may lead to deterioration in performance with the above-mentioned applications having a strict requirement in regard to the TLB or the cache.

Loads on the applications operating on the virtual machine dynamically change, which necessitates dynamic switching between the exclusive CPU mode and the shared CPU mode. However, there is a problem in that, in regard to the interrupt timer of the physical CPU, it is not possible to dynamically cause the interrupt timer of one specific virtual CPU to start or end the occupancy without erroneously executing each function that uses the interrupt timer of the physical CPU.

Therefore, this invention has an object to control occupancy of an interrupt timer of a physical CPU by an interrupt timer of a virtual CPU in a virtual machine system in conjunction with dynamic switching of a scheduling mode for the physical CPU.

A representative aspect of the present disclosure is as follows. A method of controlling a virtual machine system, the virtual machine system comprising: an interrupt controller comprising an interrupt timer; a physical processor comprising the interrupt controller; a physical computer comprising the physical processor and a physical memory; and a virtualization module configured to allocate a computer resource of the physical computer to a plurality of virtual machines, the virtualization module being configured to control allocation of the physical processor, the method comprising: a first step of generating, by the virtualization module, the plurality of virtual machines by generating: a virtual processor comprising a virtual interrupt timer obtained by virtualizing the interrupt timer and a virtual interrupt controller obtained by virtualizing the interrupt controller, to which the computer resource of the physical processor is allocated; and a virtual memory to which the computer resource of the physical memory is allocated; a second step of setting, by the virtualization module, a processor scheduling mode to any one of: a shared processor mode in which one of the physical processors allocated to the plurality of virtual machines is shared among a plurality of the virtual processors; and an exclusive processor mode in which one of the physical processors allocated to the plurality of virtual machines is occupied by a specific virtual processor; and a third step of setting, by the virtualization module, in conjunction with the processor scheduling mode, a timer scheduling mode to any one of: a shared timer mode in which the interrupt timer of the physical processor for which either one of the shared processor mode or the exclusive processor mode is set is shared among timer events for the plurality of virtual machines; and an exclusive timer mode in which the interrupt timer is occupied by a virtual timer of the specific virtual processor.

According to this invention, when a virtual CPU occupies a specific physical CPU, the interrupt timer of the virtual CPU is caused to occupy the interrupt timer of the specific physical CPU in conjunction with the occupancy of the virtual CPU. With this configuration, the overhead of the emulation of the interrupt timer of the virtual CPU can be minimized, and data eviction from a TLB or a cache by a timer function for a host, which has occurred irrespective of whether or not a program on the virtual CPU is operating, can be suppressed to ensure the performance of the physical CPU.

DETAILED DESCRIPTION OF THE PREFERRED EMBODIMENTS

Now, one embodiment to which this invention is applied is described in detail with reference to the accompanying drawings.

Figure 1:
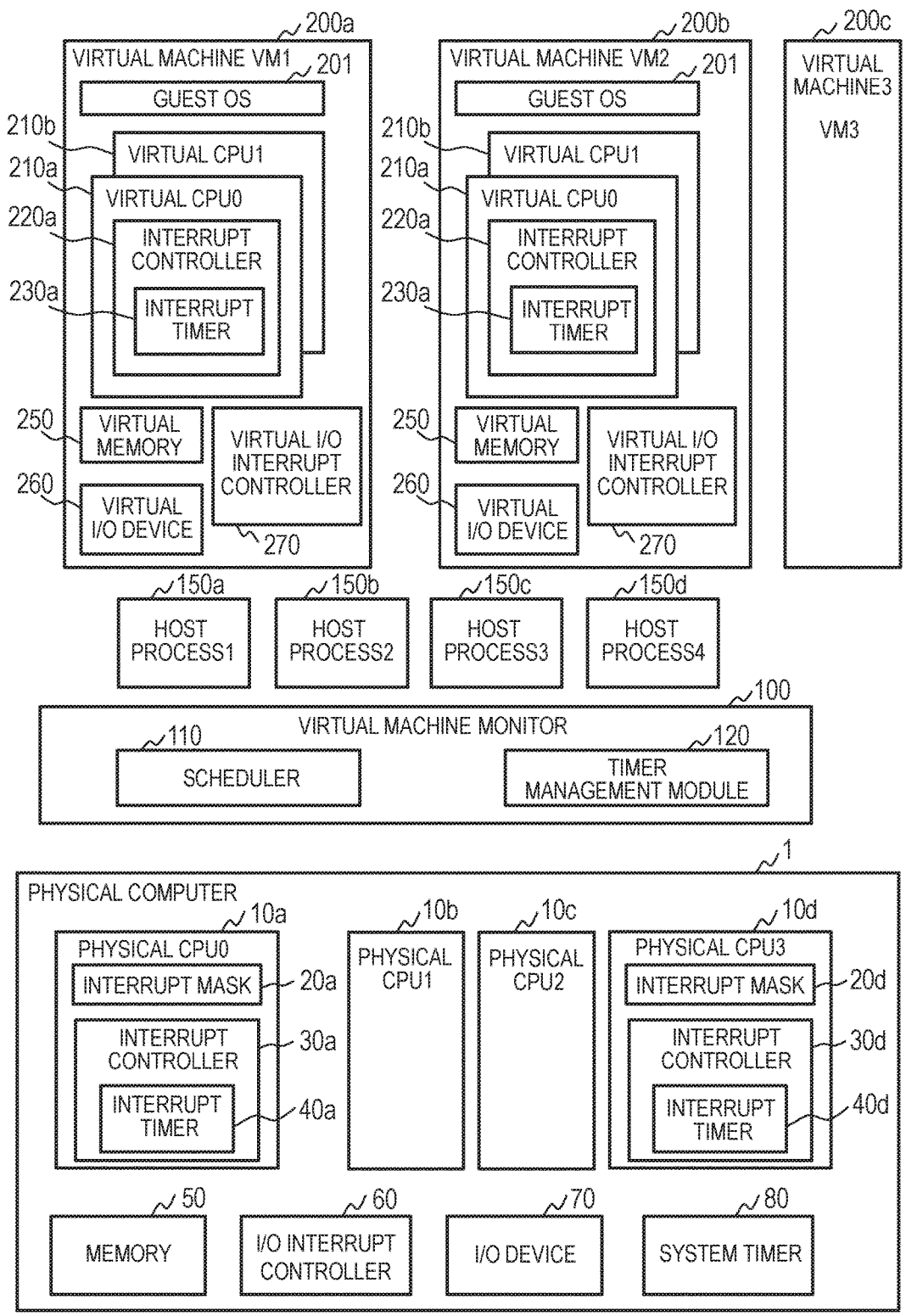
FIG. 1 is a block diagram for illustrating an example of a virtual machine system to which this invention is applied according to an embodiment of this invention.

FIG. 1 is a block diagram for illustrating an example of a virtual machine system to which this invention is applied. The virtual machine system includes a physical computer 1, a virtual machine monitor 100, and virtual machines 200a to 200c (1 to 3). In the following description, a generic virtual machine is represented by reference symbol 200 without an alphabetical suffix, while individual virtual machines are distinguished by reference symbols 200a to 200c with alphabetical suffixes. The same applies to other components, that is, the type of component is identified by a reference symbol without an alphabetical suffix, while individual components are distinguished by reference symbols with alphabetical suffixes.

The physical computer 1 includes physical CPUs 10a to 10d (0 to 3), a memory 50, an I/O interrupt controller 60, at least one I/O device 70, and a system time 80. The physical CPUs 10a to 10d (0 to 3) may be formed of processor cores of a multicore processor.

The physical CPUs 10a to 10d (0 to 3) respectively include interrupt controllers 30a to 30d built into a CPU motherboard. The interrupt controller 30a provides a function of receiving an external interrupt from a generation source of the interrupt and delivering the external interrupt to the physical CPU 0 (10a), and a function of delivering and receiving an intra-processor interrupt to/from another physical CPU 10 in a computer system including a plurality of physical CPUs 10. The interrupt controller 30a also includes an interrupt timer 40a. The interrupt controller 30a is implemented in the physical CPU 10a as, for example, a local advanced programmable interrupt controller (APIC). The interrupt timer 40a is implemented in the interrupt controller 30a as, for example, a local APIC timer.

The physical CPU 0 (10a) includes an external interrupt mask 20a. The external interrupt mask 20a provides a function of being closed to ignore the external interrupt delivered to the physical CPU 0 (10a) while being held. A program, for example, an operating system, uses an external interrupt mask between the start and the end of processing that cannot guarantee a correct operation when an external interrupt occurs during the execution of the program. The same applies to the other physical CPUs 1 to 3 (10b to 10d), that is, the physical CPUs 1 to 3 (10b to 10d) each include the interrupt controller 30, the interrupt timer 40, and the external interrupt mask 20.

The physical CPU includes a CPU virtualization assisting function as standard, but in this invention, it is irrelevant whether or not the physical CPU includes the CPU virtualization assisting function, and hence the CPU virtualization assisting function is omitted in FIG. 1 for the sake of brevity of description.

The memory 50 is used as a volatile storage device configured to store a program and data.

The I/O interrupt controller 60 provides a function of delivering a command completion notification, which is issued from the I/O device 70 to the physical CPU 10, or the like to the interrupt controller 30 of the physical CPU 10 as the external interrupt.

The I/O device 70 includes a disk controller configured to operate a disk drive and a network interface configured to communicate to/from an external computer system through a network.

The system time 80 provides a common time to be shared among all the physical CPUs 10 and to be used by the virtual machine monitor 100 to acquire a current time and an elapsed time period. As the system time 80, a real time clock (RTC), a high precision event timer (HPET), or the like can be used.

The virtual machine monitor 100 is configured to control computer resources included in the physical computer 1 to generate at least one virtual machine 200 in which a program typified by a general-purpose operating system provides a program execution environment to be recognized as one computer. The virtual machine monitor 100 is a control program for providing a role of operating a program on the virtual machine 200 in a manner equivalent to the physical computer 1 except for slight performance degradation and a slight difference in timing. The virtual machine monitor 100 includes a scheduler 110 and a timer management module 120. A virtualization module, for example, a hypervisor, may be employed in place of the virtual machine monitor 100.

The virtual machine monitor 100 controls the computer resources included in the physical computer 1 to build the virtual machines 200a to 200c (1 to 3) each including a virtual CPU 0 (210a), a virtual CPU 1 (210b), a virtual memory 250, a virtual I/O device 260, and a virtual I/O interrupt controller 270.

The virtual CPU 0 (210a) includes an interrupt controller 220a obtained by virtualizing the interrupt controller 30a. The interrupt controller (virtual interrupt controller) 220a includes an interrupt timer (virtual interrupt timer) 230a obtained by virtualizing the interrupt timer 40a in the same manner as the interrupt controller 30 of the physical CPU 10. The virtual CPU 1 (210b) has the same configuration.

A general-purpose operating system 201 operates on each of the virtual machines 200a to 200c. The general-purpose operating system 201 is specifically referred to as "guest operating system 201".

The configurations of the virtual machine 2 (200b) and the virtual machine 3 (200c) are the same as the above-mentioned configuration.

The virtual machine monitor 100 includes processes dedicated to conducting pieces of processing for controlling the virtual machine system, for example, terminal control and virtual machine system management. Those pieces of processing are each specifically referred to as "host processing", and a process dedicated to providing the host processing is referred to as "host process". In the embodiment, the virtual machine monitor 100 operates four host processes in total, which include a host process 1 (150a), a host process 2 (150b), a host process 3 (150c), and a host process 4 (150d).

The respective functional modules of the scheduler 110 and the timer management module 120 of the virtual machine monitor 100 are loaded into the memory 50 as programs.

The CPU 10 is configured to run as a functional module for providing a predetermined function by performing processing in accordance with the program of each functional module. For example, the CPU 10 is configured to function as the timer management module 120 by performing processing in accordance with a timer management program. The same also applies for the other programs. The CPU 10 is also configured to run as a functional module for providing each function of the plurality of processes executed by the various programs. A computer and a computer system are an apparatus and a system including those functional modules, respectively.

Programs, tables, and other information for achieving the individual functions of the virtual machine monitor 100 may be stored in a storage subsystem, in a storage device such as a nonvolatile semiconductor memory, a hard disk drive, or a solid state drive (SSD), or in a non-transitory computer readable data storage medium, such as an IC card, an SD card, or a DVD.

Figure 2:
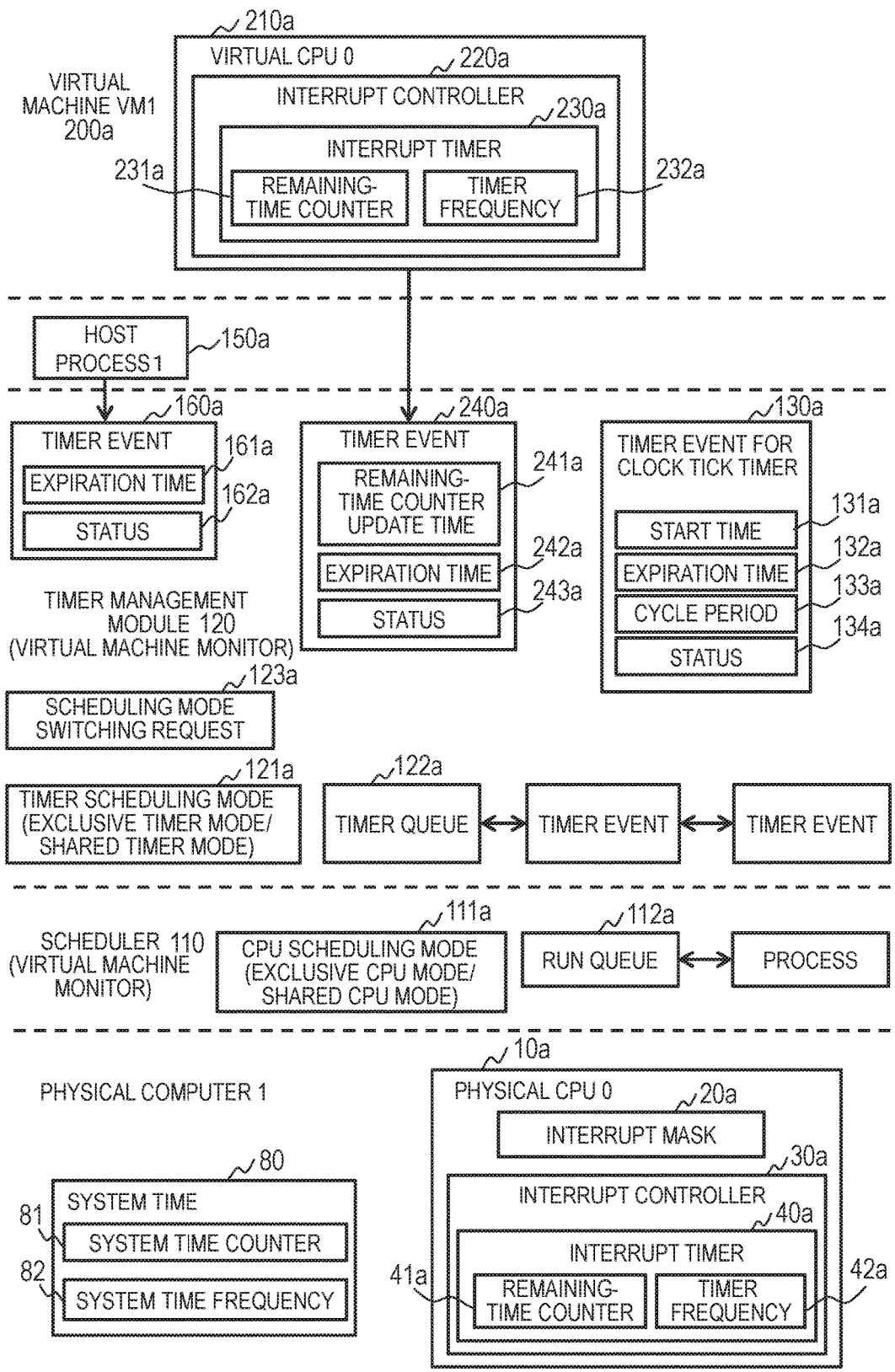
FIG. 2 is a block diagram for illustrating a detailed configuration relating to the scheduler and the timer management module according to the embodiment of this invention.

FIG. 2 is a block diagram for illustrating a detailed configuration relating to the scheduler 110 and the timer management module 120 according to the embodiment. In FIG. 2, only the physical CPU 0 (10a), the host process 1 (150a), the virtual CPU 0 (210a) of the virtual machine 1 (200a), and components directly involved with those components are extracted. The same configuration of FIG. 2 applies to another physical CPU 10, another virtual CPU 210, and another host process 150.

The interrupt timer 40a of the physical CPU 0 (10a) includes a timer frequency 42a and a remaining-time counter 41a configured to decrement a set value at a cycle period corresponding to the frequency 42a. When a value is written to the remaining-time counter 41a, the remaining-time counter 41a starts the decrementing. When the value becomes zero, the interrupt controller 30a generates a timer interrupt in the physical CPU 0 (10a). After generating the timer interrupt, the interrupt controller 30a including the remaining-time counter 41a stops the operation until the next value is written to the remaining-time counter 41a. Such a function is referred to as "interval timer function".

The system time 80 includes a system time frequency 82 and a system time counter 81 configured to monotonously increment a value at the cycle period of the system time frequency 82. The value read out from the system time counter 81 does not necessarily have an hour-minute-second format.

When the scheduler 110 of the virtual machine monitor 100 allocates the virtual CPU 210 to any one of the physical CPUs 10, the program on the relevant virtual CPU 210 is executed. When the scheduler 110 allocates the host process 150 to any one of the physical CPUs 10, the program on the relevant host process 150 is executed.

The scheduler 110 is provided with a CPU scheduling mode 111a for setting a binary value of an exclusive CPU mode or a shared CPU mode for the physical CPU 10a. A run queue 112a or the like for executing the host process 150 is also set in the scheduler 110. The CPU scheduling mode 111a can be provided for each of the physical CPUs 10a to 10d, and as described later with reference to FIG. 3A, the CPU scheduling mode 111a and CPU scheduling modes 111b to 111d are provided for the physical CPUs 10a to 10d, respectively. The run queue 112a can also be provided for each of the physical CPUs 10a to 10d.

The exclusive CPU mode is a mode in which one virtual CPU 210 occupies one physical CPU 10, and the shared CPU mode is a mode in which a plurality of virtual CPUs 210 share one physical CPU 10.

The scheduler 110 also includes a timer queue 122a configured to hold a timer event for the physical CPU 10a. The timer queue can be provided for each of the physical CPUs 10a to 10d, and as described later with reference to FIG. 4A, the timer queue 122a and timer queues 122b to 122d are set for the physical CPUs 10a to 10d, respectively.

The timer management module 120 of the virtual machine monitor 100 provides roles of, through use of the interrupt timer 40a of the physical CPU 10a, virtually realizing the interrupt timer 230a of the virtual CPU 210a, dispatching the host process 150 at a designated time, detecting a timeout of the program in operation, measuring a CPU usage amount of each piece of processing, and updating statistical information.

In order to achieve each of the above-mentioned functions, the timer management module 120 provides each of the components with a data structure relating to the timer.

The timer management module 120 provides the interrupt timer 40a of the physical CPU 0 (10a) with a timer scheduling mode 121a formed of a binary value of an exclusive timer mode or a shared timer mode. One timer scheduling mode 121a can be provided to each of the physical CPUs 10a to 10d, and as described later with reference to FIG. 4A, the timer scheduling mode 121a and timer scheduling modes 121b to 121d are provided for the physical CPUs 10a to 10d, respectively.

The exclusive timer mode is a mode in which the interrupt timer 230 of one virtual CPU 210 occupies the interrupt timer 40 of one physical CPU 10. The shared timer mode is a mode in which the timer events of a plurality of the virtual CPUs 210 share the interrupt timer 40 of one physical CPU 10.

In order to time-divisionally share the physical CPU 0 (10a) among the plurality of virtual CPUs 210, the timer management module 120 sets a timer event 130a for a clock tick timer configured to generate a timer interrupt at a fixed cycle period. The timer event 130a for the clock tick timer includes a start time 131a using the system time 80 as a time axis, an expiration time 132a, a cycle period 133a, and an enabled or disabled status 134a. The clock tick timer may be a system timer. The timer event 130 for the clock tick timer is set for each of the physical CPUs 10. For example, as described later with reference to FIG. 4A, the timer event 130a for the clock tick timer and timer events 130b to 130d for the clock tick timer can be provided.

In order to activate the host process 1 (150a) at the designated time and detect a timeout of the relevant host process 1 (150a), the timer management module 120 associates a timer event 160a with the host process 1 (150a). The timer event 160a includes an expiration time 161a using the system time 80 as the time axis and an enabled or disabled status 162a.

The interrupt timer 230a of the virtual CPU 0 (210a) of the virtual machine 1 (200a) includes a remaining-time counter 231a and a timer frequency 232a in the same manner as the interrupt timer 40a of the physical CPU 0 (10a).

In order to assist the emulation of the interrupt timer 230a, the timer management module 120 associates a timer event 240a with the virtual CPU 0 (210a). The timer event 240a includes a remaining-time counter update time 241a using the system time 80 as the time axis, an expiration time 242a, and an enabled or disabled status 243a.

In this embodiment, in order to simplify the description, the frequency of the interrupt timer 40a of the physical CPU 10a and the frequency of the interrupt timer 230a of the virtual CPU 0 (210a) are set equal to each other, but may be different from each other.

The CPU scheduling mode 111 for the physical CPU 10 is described in detail. When a given virtual CPU 210 occupies a specific physical CPU 10, the relevant physical CPU 10 operates in the exclusive CPU mode, and the physical CPU 10 that is not occupied by one specific virtual CPU 210 operates in the shared CPU mode.

Figure 3A:
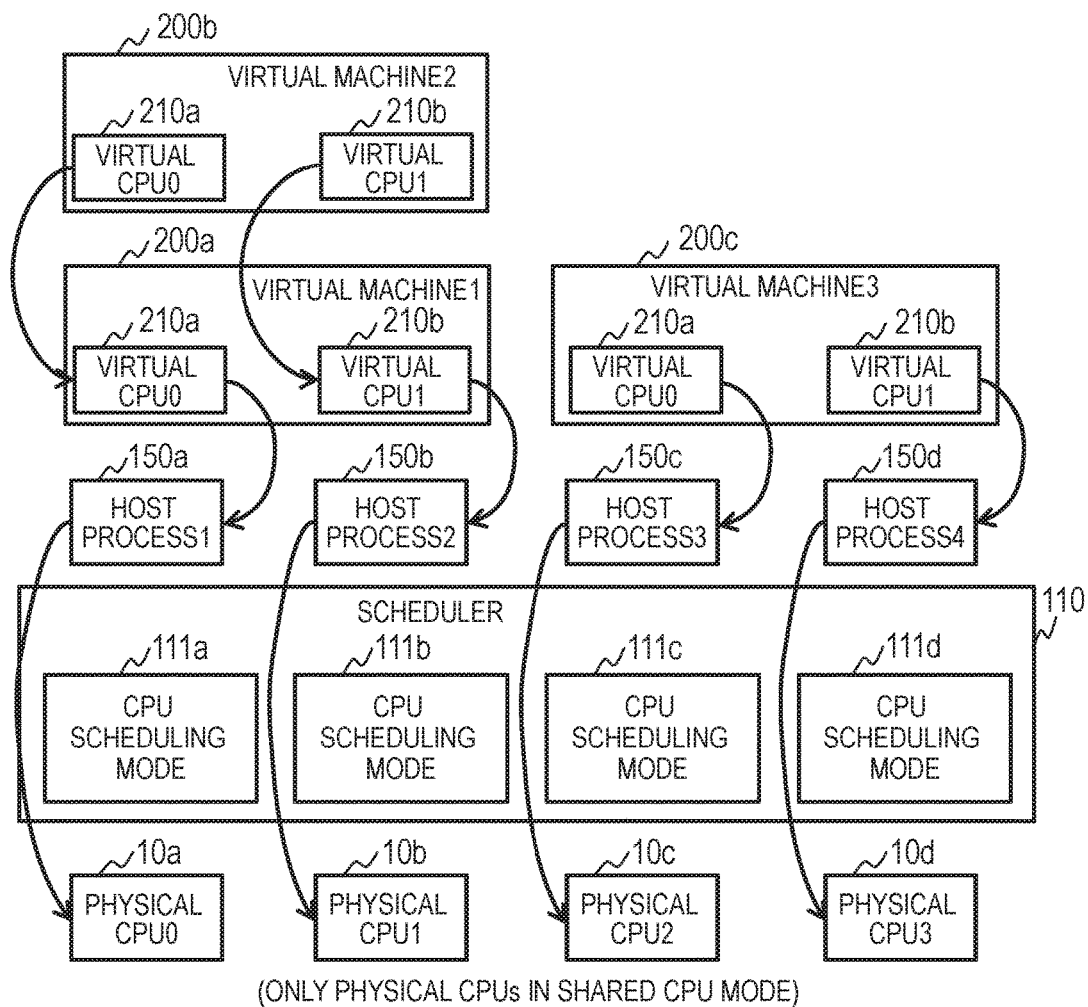
FIG. 3A is a diagram for illustrating a state of the scheduling conducted when all the physical CPUs operate in the shared CPU mode according to the embodiment of this invention.
Figure 3B:
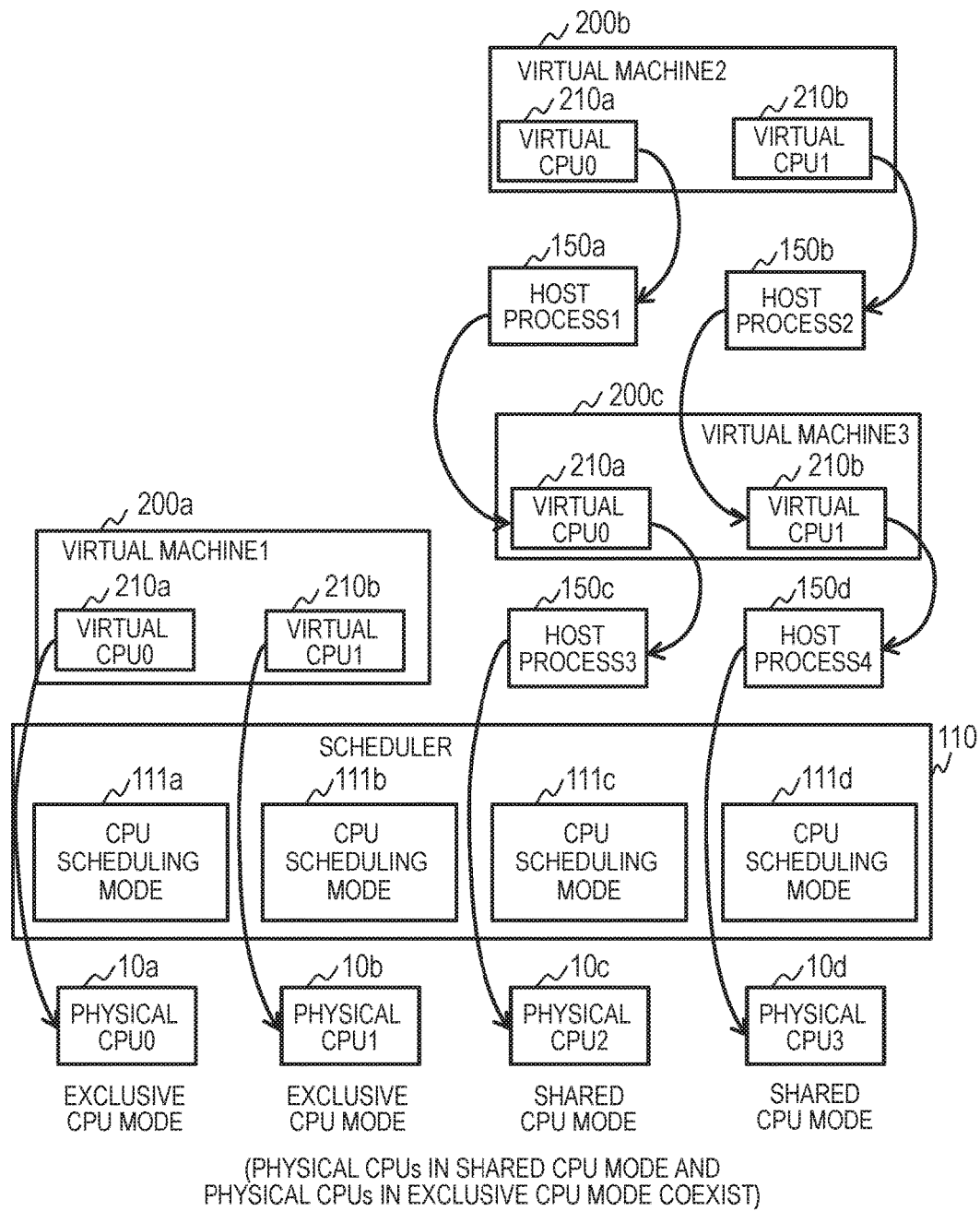
FIG. 3B is a diagram for illustrating a state of the scheduling conducted when the physical CPU 0 and the physical CPU 1 operate in the exclusive CPU mode according to the embodiment of this invention.

FIG. 3A is a diagram for illustrating a state of the scheduling conducted when all the physical CPUs operate in the shared CPU mode. FIG. 3B is a diagram for illustrating a state of the scheduling conducted when the physical CPU 0 (10a) and the physical CPU 1 (10b) operate in the exclusive CPU mode.

In FIG. 3A and FIG. 3B, an arbitrary virtual CPU 210 and an arbitrary host process 150 can operate on the physical CPUs 10 in the shared CPU mode. The scheduling of the physical CPUs 10 in the shared CPU mode is basically classified into scheduling conducted independently for each of the physical CPUs 10 and scheduling based on load balancing corresponding to the situation of loads.

The scheduling conducted independently for each of the physical CPUs 10 is enabled by associating the virtual CPU 210 or the host process 150 with the run queue 112 for one physical CPU 10 at one point in time.

Meanwhile, the load balancing is conducted by dynamically changing the association between the run queue 112 for each physical CPU 10 and the virtual CPU 210 or the host process 150. As a method for the load balancing, any publicly known or well-known method may be employed, and therefore the method is not described in detail herein.

In FIG. 3A, for example, the physical CPU 0 (10a) is time-divisionally shared among the host process 1 (150a), the virtual CPU 0 (210a) of the virtual machine 1 (200a), and the virtual CPU 0 (210a) of the virtual machine 2 (200b). The same applies to the physical CPU 1 (10b), the physical CPU 2 (10c), and the physical CPU 3 (10d).

On the physical CPU 10 in the exclusive CPU mode, only the virtual CPU 210 occupying the relevant physical CPU 10 is allowed to operate. The virtual CPU 210 and the host process 150 that were operating when the relevant physical CPU 10 was in the shared CPU mode are migrated to another physical CPU 10 in the shared CPU mode when the relevant physical CPU 10 starts the exclusive CPU mode.

In FIG. 3B, for example, the physical CPU 0 (10a) is occupied by the virtual CPU 0 (210a) of the virtual machine 1 (200*a*). Both the virtual CPU 0 (210*a*) of the virtual machine 2 (200*b*) and the host process 1 (150*a*), which were operating on the physical CPU 0 (10*a*) in FIG. 3A, are migrated to and operate on the physical CPU 2 (10*c*) in the shared CPU mode.

As the switching of the CPU scheduling mode 111*a* for the physical CPU 10, the switching from the shared CPU mode to the exclusive CPU mode or the switching from the exclusive CPU mode to the shared CPU mode can both be conducted dynamically.

When the switching is conducted from FIG. 3A to FIG. 3B, specifically, when the physical CPU 0 (10*a*) and the physical CPU 1 (10*b*) are dynamically switched from the shared CPU mode to the exclusive CPU mode, the following processing is conducted.

When the physical CPU 0 (10*a*) is taken as an example, the virtual machine monitor 100 migrates both the virtual CPU 0 (210*a*) of the virtual machine 2 (200*b*) and the host process 1 (150*a*), which were operating on the physical CPU 0 (10*a*), to the physical CPU 2 (10*c*).

Then, the virtual machine monitor 100 changes the CPU scheduling mode 111*a* for the physical CPU 0 (10*a*) to the exclusive CPU mode, and starts the occupancy by the virtual CPU 0 (210*a*) of the virtual machine 1 (200*a*). The same applies to the physical CPU 1 (10*b*).

When the switching is conducted from FIG. 3B to FIG. 3A, specifically, when the physical CPU 0 (10*a*) and the physical CPU 1 (10*b*) are dynamically switched from the exclusive CPU mode to the shared CPU mode, the following processing is conducted.

When the physical CPU 0 (10*a*) is taken as an example, the virtual machine monitor 100 first switches the physical CPU 0 (10*a*) from the exclusive CPU mode to the shared CPU mode. Then, the virtual machine monitor 100 detects that the load on the physical CPU 0 (10*a*) is lower than the loads on the physical CPU 2 (10*c*) and the physical CPU 3 (10*d*).

The virtual machine monitor 100 migrates the virtual CPU 0 (210*a*) of the virtual machine 2 (200*b*) and the host process 1 (150*a*) from the physical CPU 2 (10*c*) to the physical CPU 0 (10*a*) based on the load balancing. The patterns of migrating the virtual CPU 210 and the host process 150 in conjunction with the dynamic switching of the CPU scheduling mode 111*a* for the physical CPU 10*a* depend on occasions, and are not determined in advance. The same applies to the physical CPU 1 (10*b*).

The virtual machine monitor 100 sets the timer scheduling mode 121*a* for the interrupt timer 40 of each physical CPU 10 in conjunction with the corresponding CPU scheduling mode 111*a* for the physical CPU 10.

For example, the virtual machine monitor 100 sets the timer scheduling mode 121*a* for the interrupt timer 230*a* for the physical CPU 0 (10*a*) in conjunction with the CPU scheduling mode 111*a* for the physical CPU 0 (10*a*).

The virtual machine monitor 100 sets the timer scheduling mode 121*a* for the interrupt timer 40*a* to the shared timer mode when the physical CPU 0 (10*a*) is in the shared CPU mode, and sets the timer scheduling mode 121*a* for the interrupt timer 40*a* to the exclusive timer mode when the physical CPU 0 (10*a*) is in the exclusive CPU mode.

In other words, the timer scheduling mode 121*a* for the interrupt timer 40*a* can be dynamically switched. The above-mentioned switching can be conducted when the timer management module 120 of the virtual machine monitor 100 receives a scheduling mode switching request.

The virtual machine monitor 100 sets a scheduling mode switching request 123*a* for the physical CPU 0 (10*a*) in order to dynamically switch the CPU scheduling mode 111 and the timer scheduling mode 121. The timer management module 120 sets the received scheduling switching request in the scheduling mode switching request 123*a*. In the same manner, scheduling mode switching requests 123*b* to 123*d* are set for the physical CPUs 1 to 3 (10*b* to 10*d*), respectively.

Figure 4A:
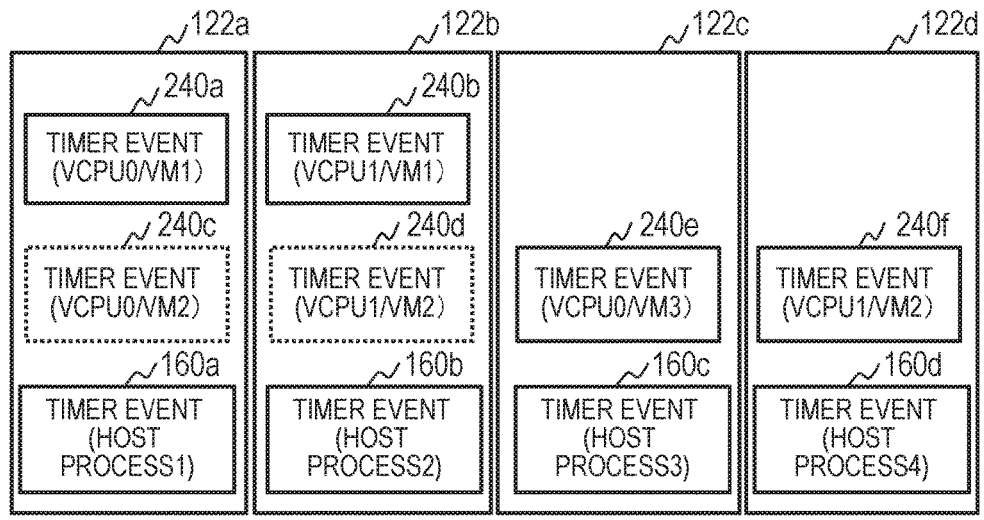
FIG. 4A is a diagram for illustrating the state of the timer management module 120 and the respective timers in the shared timer mode according to the embodiment of this invention.
Figure 4A:
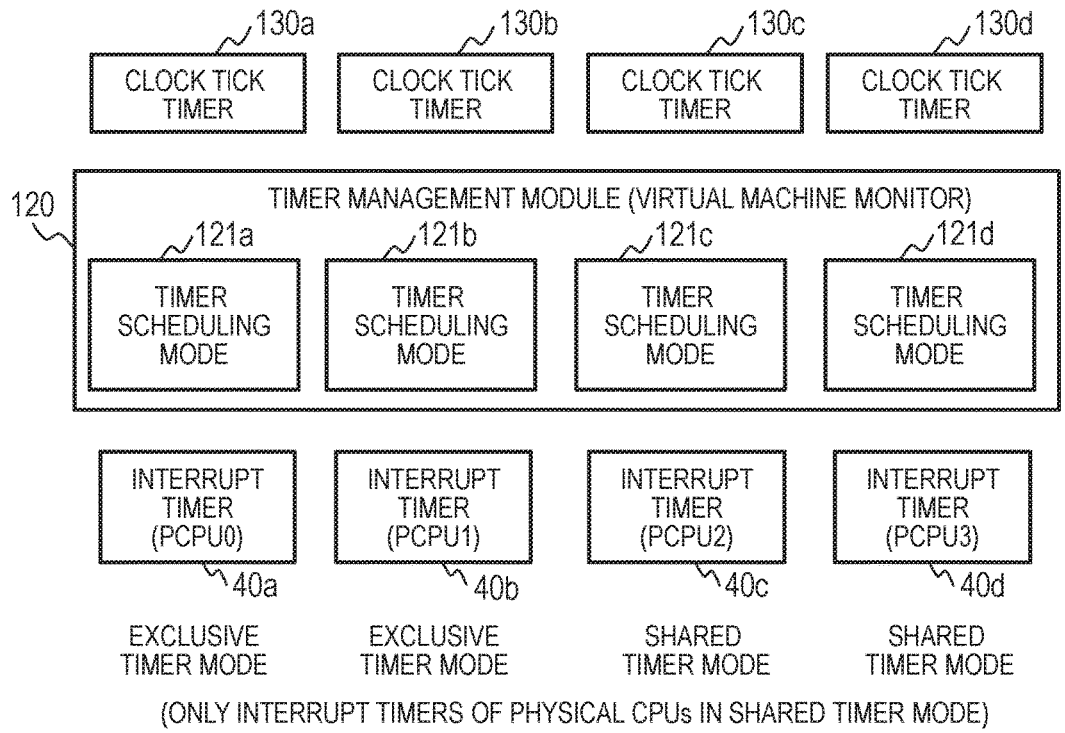
Figure 4B:
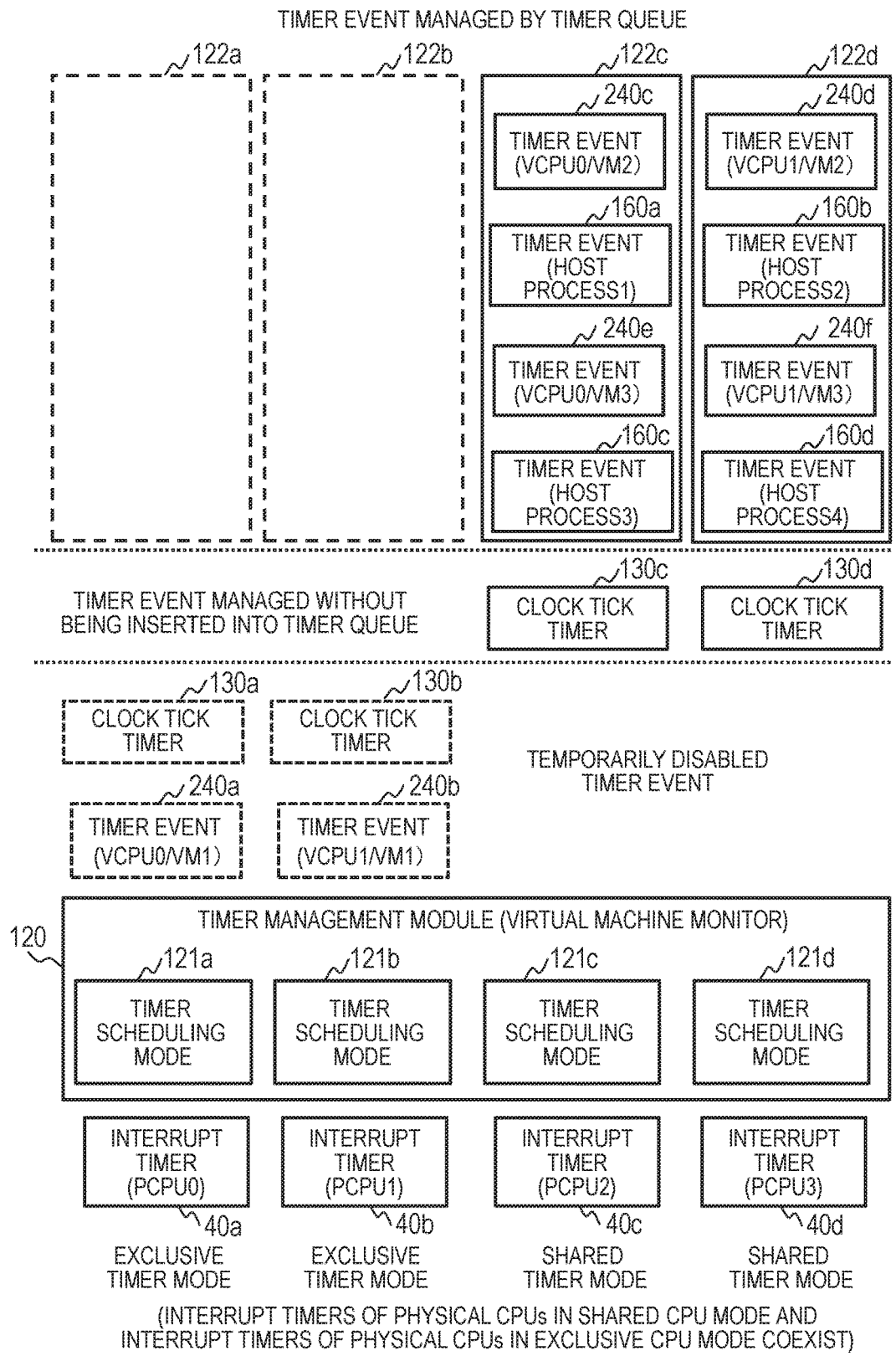
FIG. 4B is a diagram for illustrating the state of the timer management module and the respective timers in the shared timer mode and the exclusive timer mode according to the embodiment of this invention.

FIG. 4A and FIG. 4B are conceptual diagrams of the states of timers exhibited when the states of the scheduling of the physical CPUs 10 are those illustrated in FIG. 3A and FIG. 3B, respectively. FIG. 4A is a diagram for illustrating the state of the timer management module 120 and the respective timers in the shared timer mode. FIG. 4B is a diagram for illustrating the state of the timer management module 120 and the respective timers in the shared timer mode and the exclusive timer mode.

FIG. 4A is an illustration of the state in which the interrupt timers 40 of all the physical CPUs 10 are in the shared timer mode. FIG. 4B is an illustration of the state in which the interrupt timer 40*a* of the physical CPU 0 (10*a*) and the interrupt timer 40*b* of the physical CPU 1 (10*b*) are in the exclusive timer mode and the interrupt timer 40*c* of the physical CPU 2 (10*c*) and the interrupt timer 40*d* of the physical CPU 3 (10*d*) are in the shared timer mode.

On the physical CPU 10 having the interrupt timer 40 in the shared timer mode, the interrupt timer 40 of the relevant physical CPU 10 is shared among the timer event 240 for the interrupt timer 230 of the virtual CPU 210, the timer event 160 of the host process 150, and the timer event 130 for the clock tick timer of the relevant physical CPU 10, which share the relevant physical CPU 10.

In FIG. 4A, for example, the timer event 240*a* for the virtual CPU 0 (210*a*) of the virtual machine 1 (200*a*), the timer event for the virtual CPU 0 (210*a*) of the virtual machine 2 (200*b*), and the timer event 160*a* for the host process 1 (150*a*) are managed on the interrupt timer 40*a* of the physical CPU 0 (10*a*) by being inserted into the timer queue 122*a*. In the figures, the virtual machine 1 is represented by "VM 1", the virtual CPU 0 is represented by "VCPU 0", and the physical CPU 0 is represented by "PCPU 0".

The timer event 130*a* for the clock tick timer of the physical CPU 0 (10*a*) is managed without being inserted into the timer queue 122*a*. The timer event 130*a* for the clock tick timer is not inserted into the timer queue 122*a* because the timer event 130*a* for the clock tick timer is not migrated between the physical CPUs 10.

On the physical CPU 10 having the interrupt timer 40 in the exclusive timer mode, the interrupt timer 40 of the relevant physical CPU 10 is occupied by the interrupt timer 230 of the virtual CPU 210 occupying the relevant physical CPU 10.

As illustrated in FIG. 4B, in the exclusive timer mode, the timer event 240*a* for the interrupt timer 230*a* of the virtual CPU 210*a* is not used and is disabled, and the timer event 130*a* for the clock tick timer of the relevant physical CPU 10*a* is also disabled. The timer event that was inserted in the timer queue 122*a* for the relevant physical CPU 10*a* is migrated to the timer queue for another physical CPU 10*c* in the shared timer mode.

In FIG. 4B, for example, the interrupt timer 40*a* of the physical CPU 0 (10*a*) in the exclusive timer mode is occupied by the interrupt timer 230*a* of the virtual CPU 0 (210*a*) of the virtual machine 1 (200*a*). Further, the timer event 240*a* for the virtual CPU 0 (210*a*) of the virtual machine 1 (200*a*) is extracted from the timer queue 122*a* and is disabled, and the timer event 130*a* for the clock tick timer is also disabled.

In FIG. 4B, the timer event 160a for the host process 1 (150a) and the timer event 240c for the virtual CPU 0 (210a) of the virtual machine 2 (200b), which were inserted in the timer queue 122a in FIG. 4A, are both inserted in the timer queue 122c for the physical CPU 2 (10c).

Now, a description is made of the updating of the interrupt timer 230a of the virtual CPU 210 on the physical CPU 10 in the shared timer mode and processing for delivering the timer interrupt to the virtual CPU 210 in conjunction with the timer interrupt issued from the interrupt controller 30 of the relevant physical CPU 10.

Then, a description is made of the updating of the interrupt timer 230a of the virtual CPU 210 on the physical CPU 10 in the exclusive timer mode and processing for delivering the timer interrupt to the virtual CPU 210 in conjunction with the timer interrupt issued from the interrupt controller 30a of the relevant physical CPU 10. Finally, a description is made of processing for dynamically switching the timer scheduling mode 121a for the interrupt timer 40 of the physical CPU 10.

First, the interrupt timer 40a of the physical CPU 0 (10a) of FIG. 4A is taken as an example to describe the updating of the interrupt timer 230a of the virtual CPU 210a on the physical CPU 10a in the shared timer mode and the processing for delivering the timer interrupt to the virtual CPU 210 in conjunction with the timer interrupt issued from the interrupt controller 30a of the relevant physical CPU 10.

Figure 5:
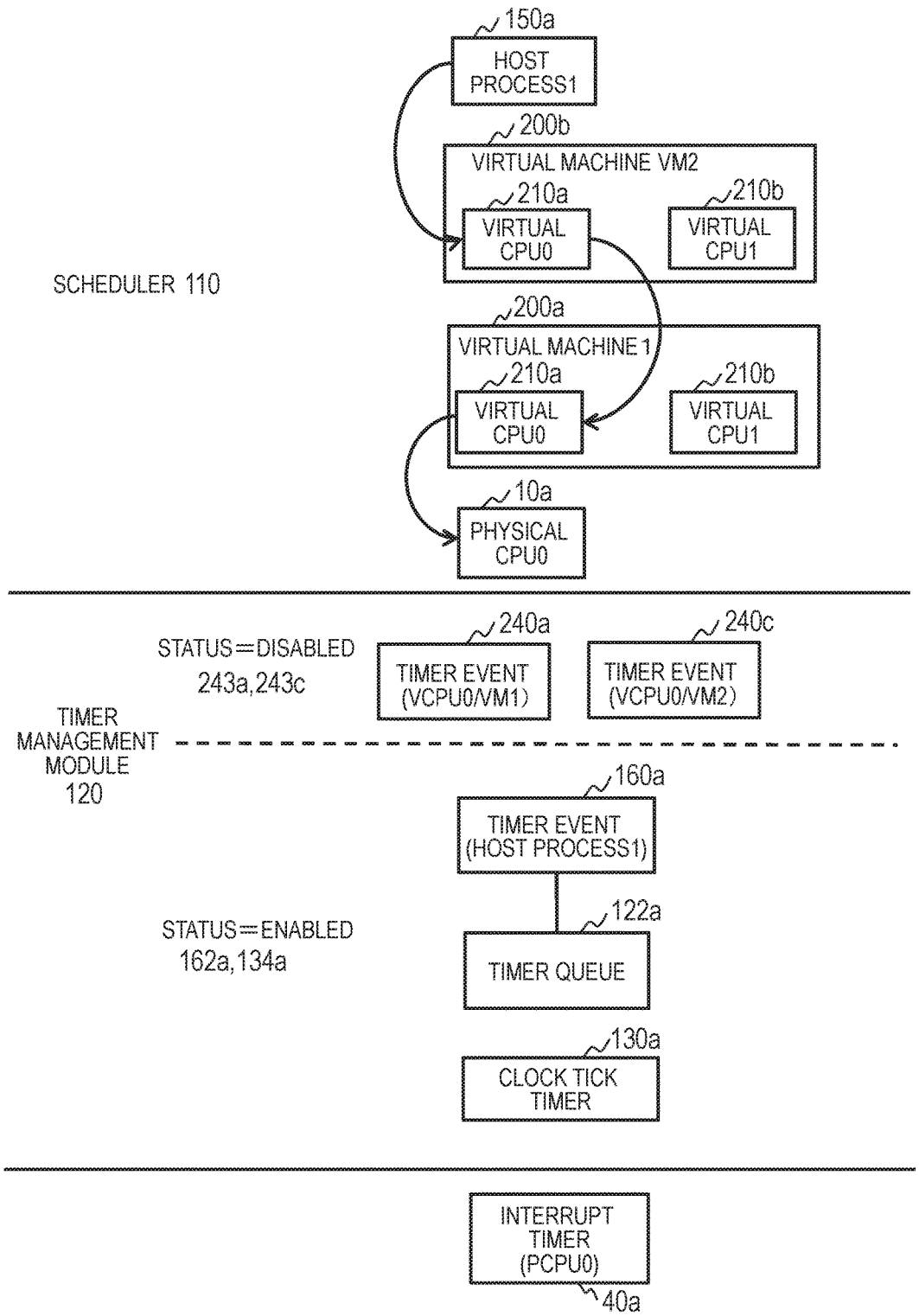
FIG. 5 is a diagram for illustrating a state of the scheduler and the timer management module according to the embodiment of this invention.
Figure 6:
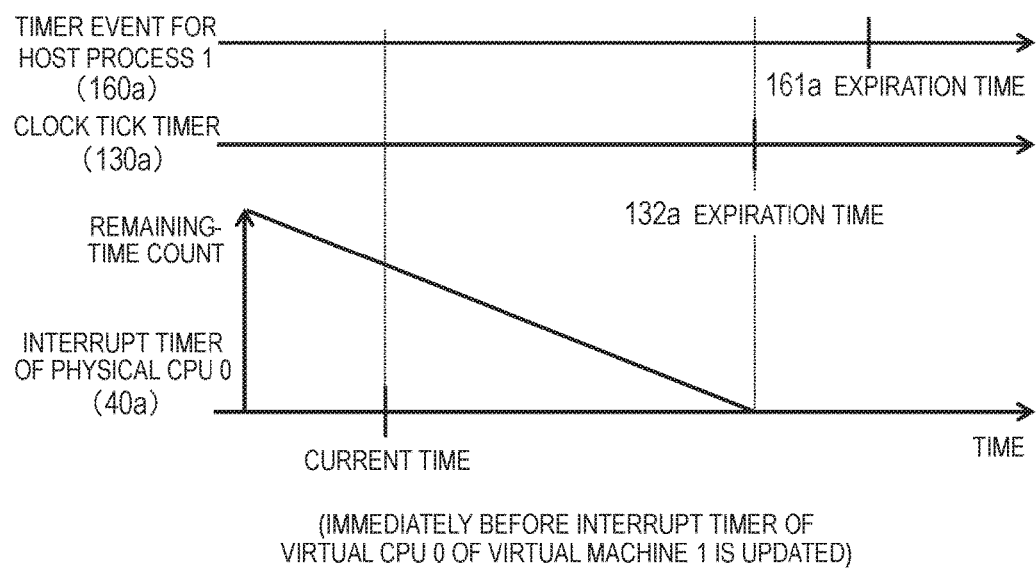
FIG. 6 is a graph for showing a relationship between the expiration time of the timer event and the remaining-time counter of the interrupt timer of the physical CPU in the shared timer mode according to the embodiment of this invention.

FIG. 5 is a diagram for illustrating a state of the scheduler 110 and the timer management module 120 exhibited immediately before the remaining-time counter 231a of the interrupt timer 230a of the virtual CPU 0 (210a) of the virtual machine 1 (200a) is updated. FIG. 6 is a graph for showing a relationship between the expiration time of the timer event and the remaining-time counter 41a of the interrupt timer of the physical CPU 10 in the shared timer mode.

In the graph of FIG. 6, the relationship between the timer event 160a for the host process 1 exemplified as an enabled timer event and the remaining-time counter 41a of the interrupt timer 40a of the physical CPU 0 (10a) is shown in time series.

As illustrated in FIG. 5, the virtual CPU 0 (210a) of the virtual machine 1 (200a) is operating on the physical CPU 0 (10a). The remaining-time counters 231a of both the interrupt timer 230a of the virtual CPU 0 (210a) of the virtual machine 1 (200a) and the interrupt timer 230a of the virtual CPU 0 (210a) of the virtual machine 2 (200b) have a value of zero, and the status 243a and the status 243c of the corresponding timer events 240a and 240c, respectively, are both disabled.

The timer event 160a of the host process 1 (150a) has a value set in the expiration time 161a with the status 162a being enabled, and is inserted in the timer queue 122a for the physical CPU 0 (10a). The timer event 130a for the clock tick timer of the physical CPU 0 (10a) has a value set in the expiration time 132a with the status 134a being enabled.

In FIG. 6, in comparison between the expiration time 132a of the timer event 130a for the clock tick timer and the expiration time 161a of the timer event 160a of the host process 1 (150a), the expiration time 132a of the timer event 130a for the clock tick timer arrives first. Therefore, the expiration time 132a of the timer event 130a for the clock tick timer is set in the remaining-time counter 41a of the interrupt timer 40a of the physical CPU 0 (10a).

Figure 7:
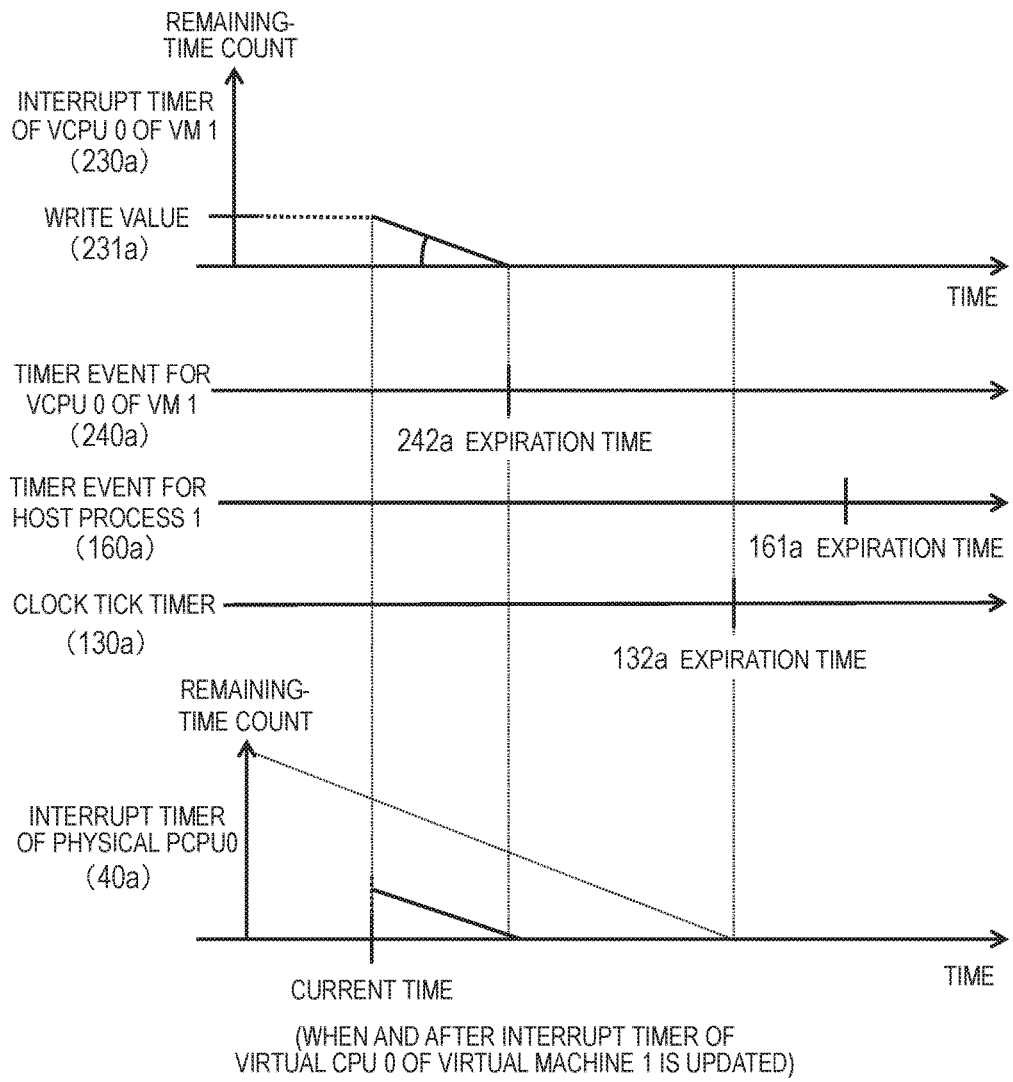
FIG. 7 is a graph for showing a relationship between the expiration time of the timer event and the remaining-time counter of the interrupt timer of the physical CPU in the shared timer mode according to the embodiment of this invention.
Figure 8A:
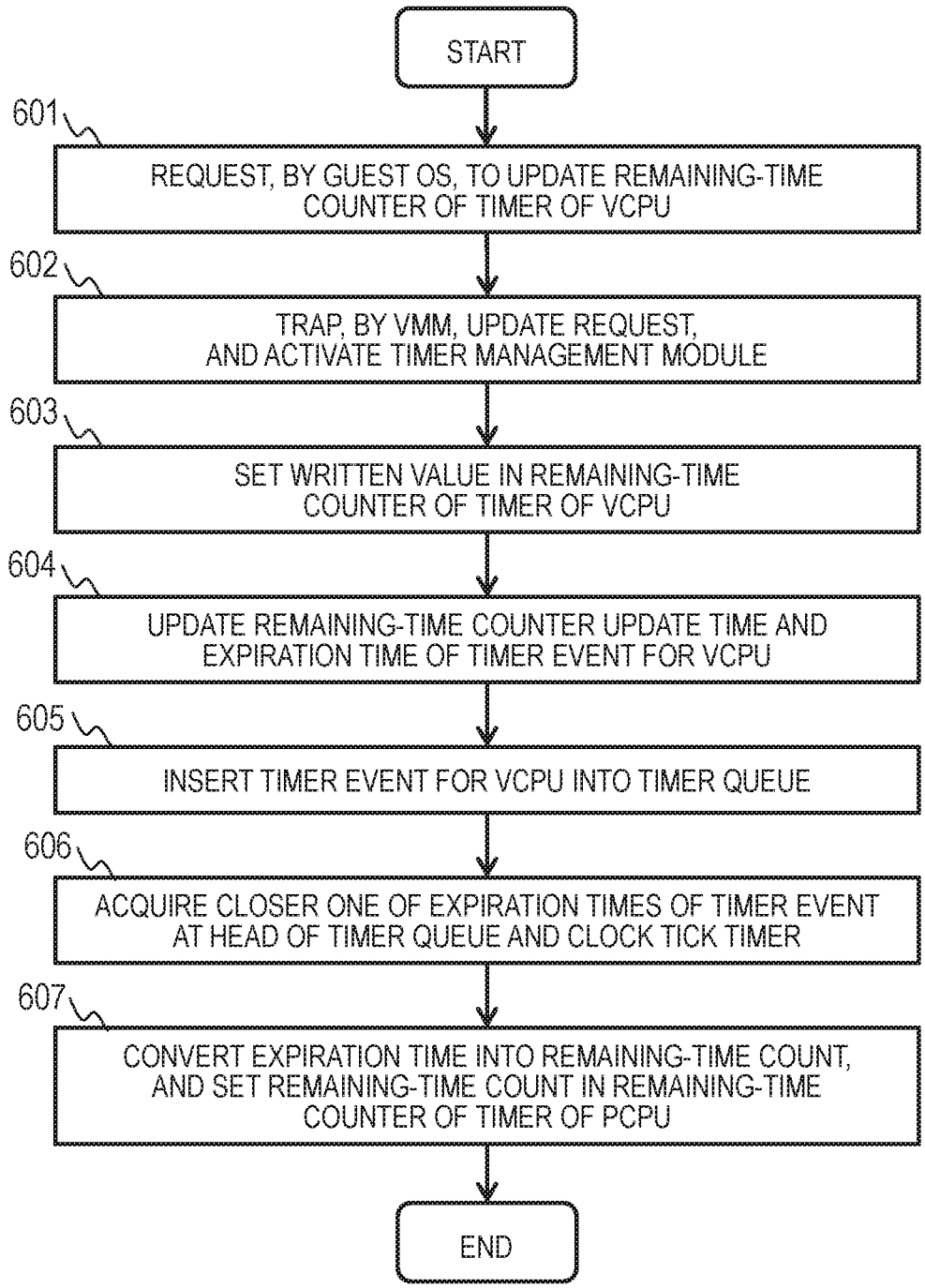
FIG. 8A is a flowchart for illustrating an example of processing for updating the remaining-time counter of the interrupt timer of the virtual CPU on the physical CPU in the shared timer mode according to the embodiment of this invention.

With reference to FIG. 8A, a description is made of processing conducted after the guest operating system 201 operating on the virtual CPU 0 (210a) writes a value to the remaining-time counter 231a of the interrupt timer 230a until the state of FIG. 7 is finally obtained.

FIG. 7 is a graph for showing a relationship between the expiration time of the timer event and the remaining-time counter 41 of the interrupt timer 40 of the physical CPU 10 in the shared timer mode. FIG. 8A is a flowchart for illustrating an example of processing for updating the remaining-time counter of the interrupt timer 230a of the virtual CPU 210a on the physical CPU 10a in the shared timer mode.

In FIG. 8A, the guest operating system 201 operating on the virtual CPU 0 (210a) requests the remaining-time counter 231a of the interrupt timer 230a to update the value (Step 601).

The virtual machine monitor 100 traps the update request issued by the remaining-time counter 231a of the virtual CPU 210a, and transfers control to the timer management module 120 (Step 602). The virtual machine monitor 100 may activate the timer management module 120 at this point in time.

The timer management module 120 sets the value requested to be updated in the remaining-time counter 231a of the interrupt timer 230a of the virtual CPU 210a (Step 603).

The timer management module 120 reads the value of the system time counter 81 of the system time 80 to acquire the current time. Then, the timer management module 120 sets the acquired current time in the remaining-time counter update time 241a of the timer event 240a associated with the virtual CPU 0 (210a), and updates the expiration time 242a of the timer event 240a based on Expression A described below (Step 604).

(Expiration time (242a) of timer event (240a))=(current time)+((remaining-time counter (231a) of interrupt timer (230a))×(system time frequency (82)))/(interrupt timer frequency (232a))   (Expression A)

When the frequency of the interrupt timer 40a of the physical CPU 10a and the frequency 232a of the interrupt timer 230a of the virtual CPU 0 (210a) are equal to each other in (Expression A), the system time frequency 82 may be omitted in the calculation of Expression A or the like. The same applies to Expressions B and D described later.

Incidentally, in a computer system in which the virtual machine 200 is migrated among a plurality of physical computers 1, it is premised that the virtual CPU 210 operates with the same frequency before and after the migration. Meanwhile, the frequency of the physical CPU 10 may differ before and after the migration because the frequency depends on the physical computer 1.

Therefore, in the computer system in which the virtual machine 200 is migrated among the plurality of physical computers 1, the timer frequency 42 of the interrupt timer 40 of the physical CPU 10 and the timer frequency 232 of the interrupt timer 230 of the virtual CPU 210 may often differ from each other. According to the embodiment of this invention, the virtual CPU 210 is allowed to dynamically occupy the interrupt timer 40 of the physical CPU 10 based on Expression A or the like in consideration of such a difference in timer frequency as described above.

Then, the timer management module 120 sets the status 243a of the timer event 240a to "enabled", and inserts the timer event 240a into the timer queue 122a (Step 605). The timer management module 120 compares the expiration times of the timer events within the timer queue 122a with each other, and sorts the timer events in ascending order of the time axis of the system time 80 (namely, chronological order of the expiration time).

In the situation of FIG. 7, when the timer management module 120 inserts the timer event 240a into the timer queue 122a, the timer event 160a of the host process 1 (150a) is already inserted in the timer queue 122a.

The timer management module 120 compares the expiration times within the timer queue 122a with each other as described above, determines that the expiration time 242a of the timer event 240a is closer than the expiration time 161a of the timer event 160a, and migrates the timer event 240a to the head of the timer queue 122a.

After finishing inserting the timer event 160a into the timer queue 122a, the timer management module 120 compares the expiration time 242a of the timer event 240a at the head of the timer queue 122a and the expiration time 132a of the timer event 130a for the clock tick timer. The timer management module 120 acquires the closer expiration time of the timer event as the nearest expiration time (Step 606).

The timer management module 120 reads the system time counter 81 of the system time 80 to acquire the current time, and subtracts the current time from the nearest expiration time to calculate the remaining time. Then, the timer management module 120 converts the remaining time before the expiration time into a count number (remaining-time count) of the interrupt timer 40a based on Expression B described below.

The timer management module 120 sets the value (remaining-time count) calculated by Expression B in the remaining-time counter 41a of the interrupt timer 40a of the physical CPU 0 (10a) (Step 607).

(Remaining-time count)=((remaining time)×(interrupt timer frequency 42a))/(system time frequency 82a)   (Expression B)

When the flowchart of FIG. 8A is executed by the above-mentioned processing in the states of FIG. 5 and FIG. 6, a value corresponding to the expiration time 242a of the timer event 240a migrated to the head of the timer queue 122a is set in the remaining-time counter 41a of the interrupt timer 40a in which the remaining-time count of the timer event 160a for the host process 1 was set. Thus, the state of FIG. 7 is obtained.

In a related-art virtual machine system, the timer event 130a for the clock tick timer is always enabled except in a temporary case where the expiration time 132a of the timer event 130a is updated. Therefore, even when the timer queue 122a is empty, the interrupt timer 40a of the physical CPU 0 (10a) keeps operating, and the interrupt controller 30a keeps generating the timer interrupt at least at a fixed cycle period.

The above-mentioned processing also allows the guest OS 201 to determine that the updating processing relating to the remaining-time counter 231a of the interrupt timer 230a of the virtual CPU 210a has been completed.

Next, the current time progresses from the state of FIG. 7, and the timer interrupt is generated by the interrupt controller 30a when the interrupt timer 40a of the physical CPU 0 (10a) finishes the counting. With reference to the flowchart of FIG. 8B and FIG. 8C, a description is made of processing conducted before the timer interrupt is delivered to the virtual CPU 0 (210a) of the virtual machine 1 (200a).

Figure 8B:
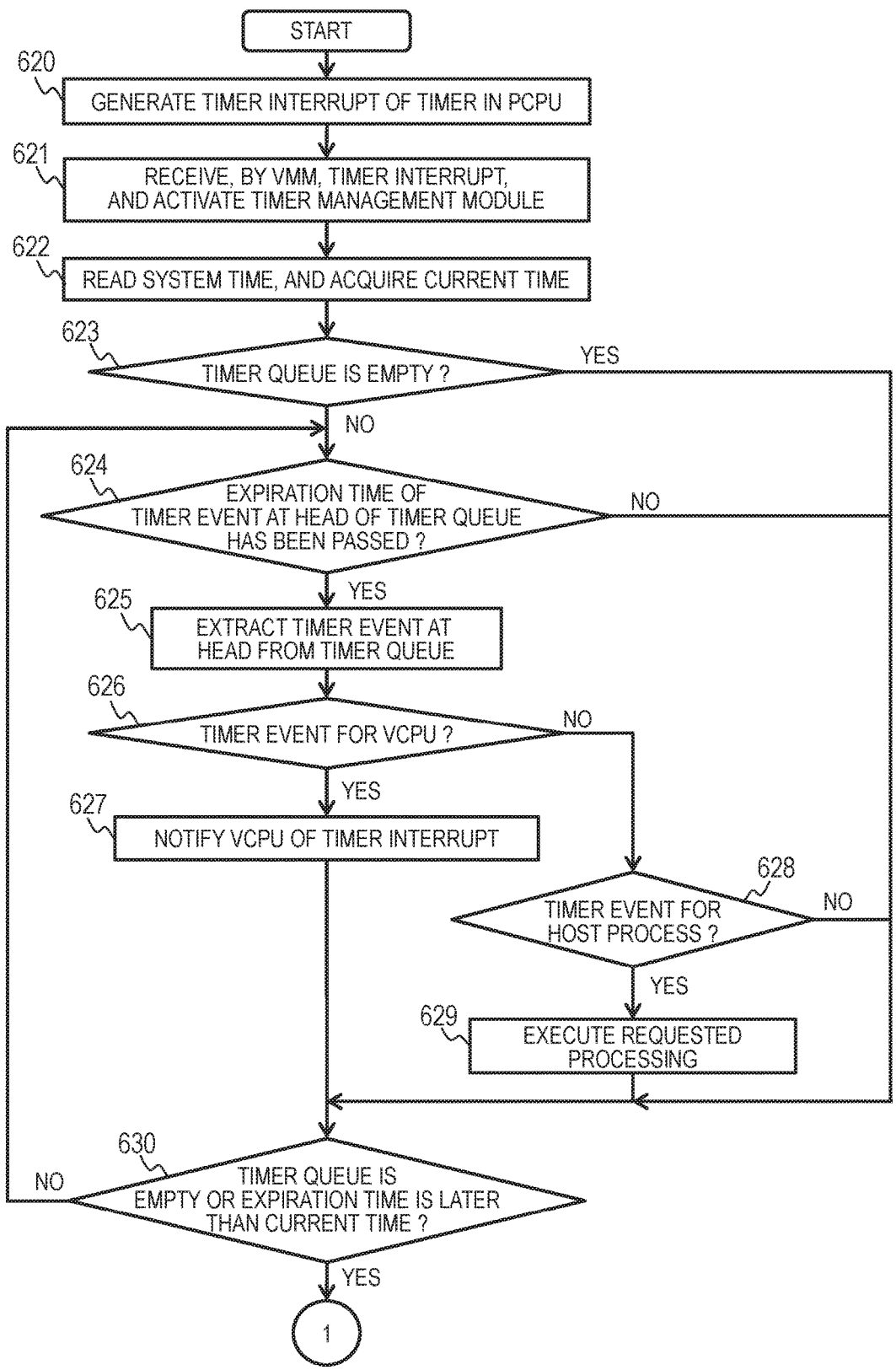
FIG. 8B is the first half of the flowchart for illustrating an example of the processing for delivering the timer interrupt of the virtual CPU on the physical CPU in the shared timer mode according to the embodiment of this invention.
Figure 8C:
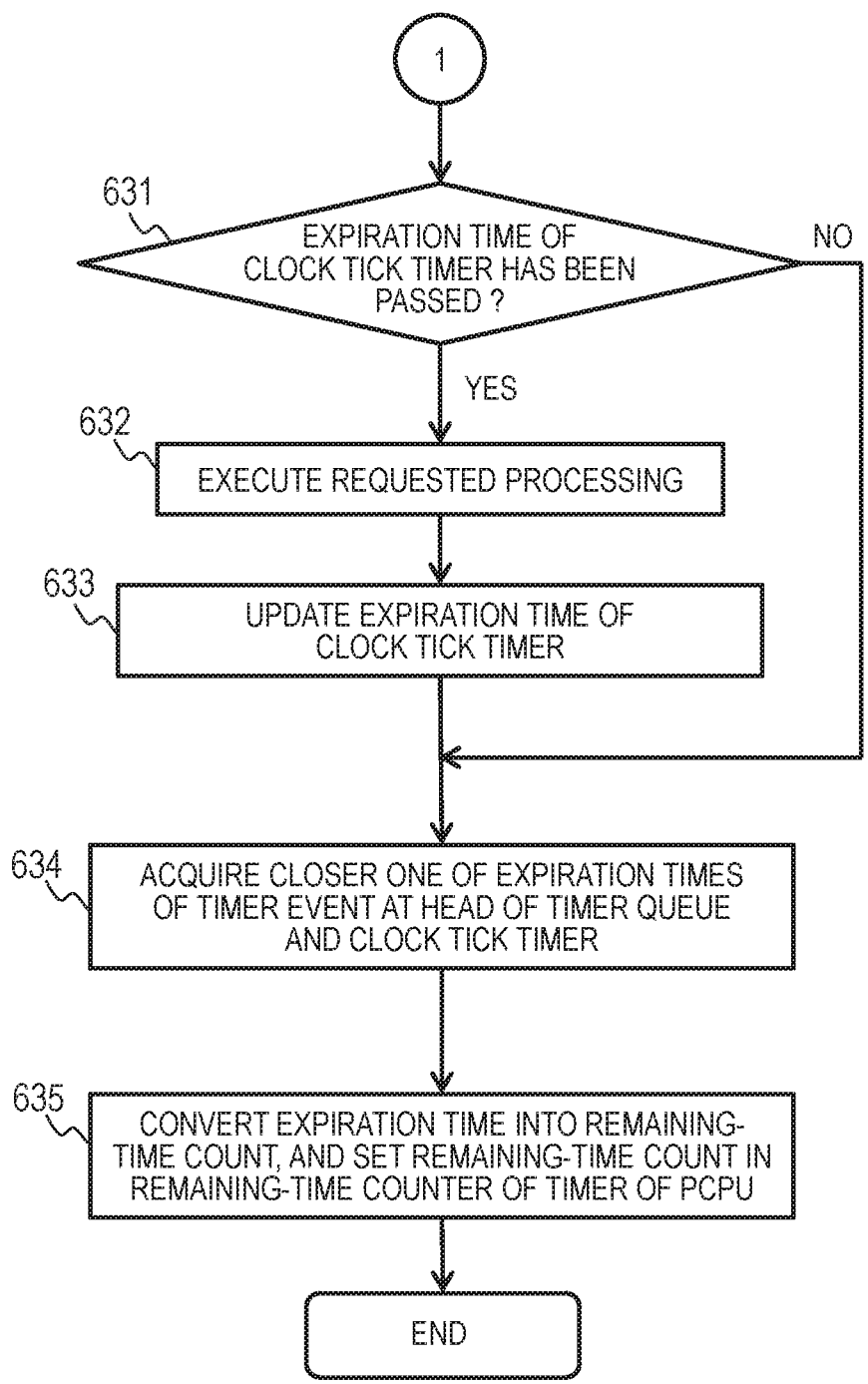
FIG. 8C is the second half of the flowchart for illustrating an example of the processing for delivering the timer interrupt of the virtual CPU on the physical CPU in the shared timer mode according to the embodiment of this invention.

FIG. 8B is the first half of the flowchart for illustrating an example of the processing for delivering the timer interrupt of the virtual CPU 210 on the physical CPU 10 in the shared timer mode. FIG. 8C is the second half of the flowchart for illustrating the example of the above-mentioned transmission processing.

When the remaining-time counter 41a of the interrupt timer 40a of the physical CPU 0 (10a) is updated by the above-mentioned processing of FIG. 8A, the remaining-time counter 41a starts the decrementing at the cycle period of the frequency 42a.

When the value of the remaining-time counter 41a becomes zero, the interrupt controller 30a generates the timer interrupt, and notifies the physical CPU 0 (10a) of the timer interrupt (Step 620). The timer interrupt is delivered to the virtual machine monitor 100, and the virtual machine monitor 100 activates the timer management module 120 (Step 621). When the timer management module 120 has already been activated, the virtual machine monitor 100 starts the control of the timer management module 120.

The timer management module 120 reads the system time counter 81 of the system time 80 to acquire the current time (Step 622). The timer management module 120 determines whether or not the timer queue 122a for the physical CPU 0 (10a) is empty (Step 623). When the timer queue 122a is not empty, the procedure advances to Step 624, and when the timer queue 122a is empty, advances to Step 631 of FIG. 8C.

The timer management module 120 refers to the timer queue 122a to compare the expiration time of the timer event at the head and the current time (Step 624). Then, the timer management module 120 determines whether or not the current time has passed the expiration time of the timer event at the head of the timer queue 122a.

When the current time has passed the expiration time of the timer event at the head of the timer queue 122a, the procedure advances to Step 625, and when the current time has not passed the expiration time of the timer event, advances to Step 630.

In Step 625, the current time has passed the expiration time of the timer event at the head, and hence the timer management module 120 extracts the relevant timer event from the timer queue 122a, and sets the status 243 to "disabled".

In Step 626, the timer management module 120 determines whether or not the timer event extracted in Step 625 is the timer event 240a for the virtual CPU 210a. When the extracted timer event is the timer event 240a for the virtual CPU 210a, the procedure advances to Step 627, and otherwise advances to Step 628.

In Step 627, the extracted timer event is the timer event 240a for the virtual CPU 0 (210a), and hence the timer management module 120 notifies the virtual CPU 0 (210a) of the timer interrupt. When receiving the interrupt, the virtual CPU 0 (210a) executes predetermined processing corresponding to the timer event 240a.

Meanwhile, in Step 628, the timer management module 120 determines whether or not the timer event extracted in Step 625 is the timer event 160a for the host process 1 and whether or not the expiration time 161a has been passed (execution start). When the expiration time 161a has been passed, the procedure advances to Step 629, and otherwise the procedure advances to Step 630.

In Step 629, the processing of the host process 150a requested by the timer event 160a is executed.

In Step 630, the timer management module 120 determines whether or not the timer queue 122a is empty and whether or not the expiration time of the timer event at the head of the timer queue 122a is later than the current time. When the timer queue 122a is not empty or when the expiration time of the timer event at the head is earlier than the current time, the procedure returns to Step 624 to repeat the above-mentioned processing, and otherwise the procedure advances to Step 631.

In Step 624 and subsequent steps, the timer management module 120 repeats the above-mentioned processing until the timer queue 122a becomes empty or until the expiration time of the timer event at the head of the timer queue 122a becomes later than the current time.

Subsequently, in Step 631 of FIG. 8C, the timer management module 120 compares the expiration time 132a of the timer event 130a for the clock tick timer of the physical CPU 0 (10a) and the current time (Step 631). When the expiration time 132a of the timer event 130a has been passed, the timer management module 120 advances to Step 632, and otherwise advances to Step 634.

In the example of FIG. 6, the expiration time 132a is later than the current time, and hence the procedure advances to Step 634. When the current time has passed the expiration time 132a of the timer event 130a, the processing requested by the clock tick timer is executed (Step 632).

The timer management module 120 updates the expiration time 132a of the timer event 130a based on Expression C described below (Step 633).

(Expiration time (132a))=(start time 131a)+(((cycle period 133a)+(current time)−(start time 131a))/ (cycle period 133a))×(cycle period 133a)   (Expression C)

In the same manner as when the remaining-time counter 231a of the interrupt timer 230a of the virtual CPU 0 (210a) was updated previously, the timer management module 120 compares the expiration time of the timer event at the head of the timer queue 122a for the physical CPU 0 (10a) and the expiration time 132a of the timer event 130a for the clock tick timer, and acquires the closer expiration time (Step 634).

The timer management module 120 converts units of the acquired expiration time into the count number based on Expression B described above in the same manner, and sets the count number to the remaining-time counter 41a of the interrupt timer 40a of the physical CPU 0 (10a) (Step 635).

By the above-mentioned processing, on the physical CPU 10 in the shared timer mode, the timer management module 120 can notify a computer resource corresponding to the timer event of the timer interrupt generated by the interrupt controller 30a, and can execute the processing corresponding to the timer event. When the timer event is the timer event 240a for the virtual CPU 210a, the timer management module 120 can notify the virtual CPU 210a of the timer interrupt, and can execute predetermined processing.

Then, the timer management module 120 can prepare the next timer interrupt by setting a new expiration time in the remaining-time counter 41a of the interrupt timer 40a of the physical CPU 10.

Figure 9A:
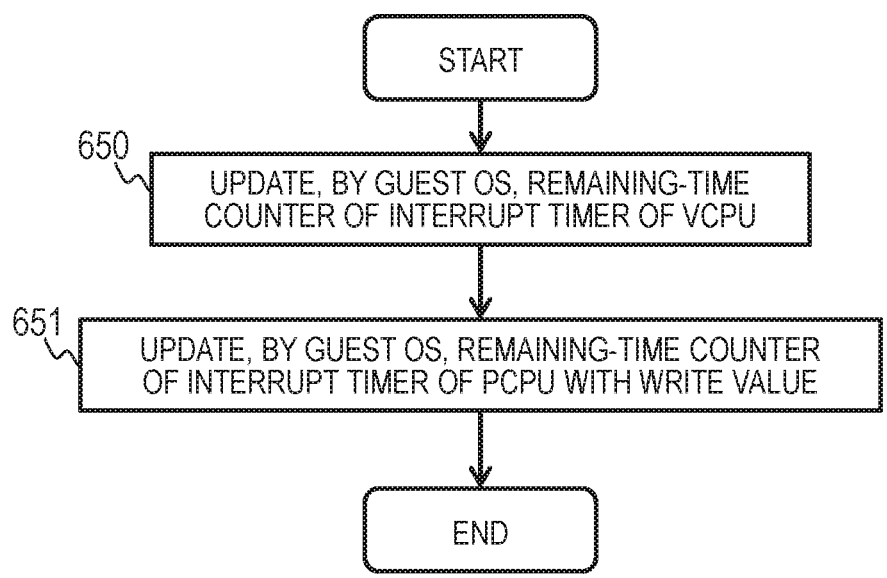
FIG. 9A is a flowchart for illustrating an example of the processing for updating the remaining-time counter of the interrupt timer of the virtual CPU on the physical CPU in the exclusive timer mode according to the embodiment of this invention.
Figure 9B:
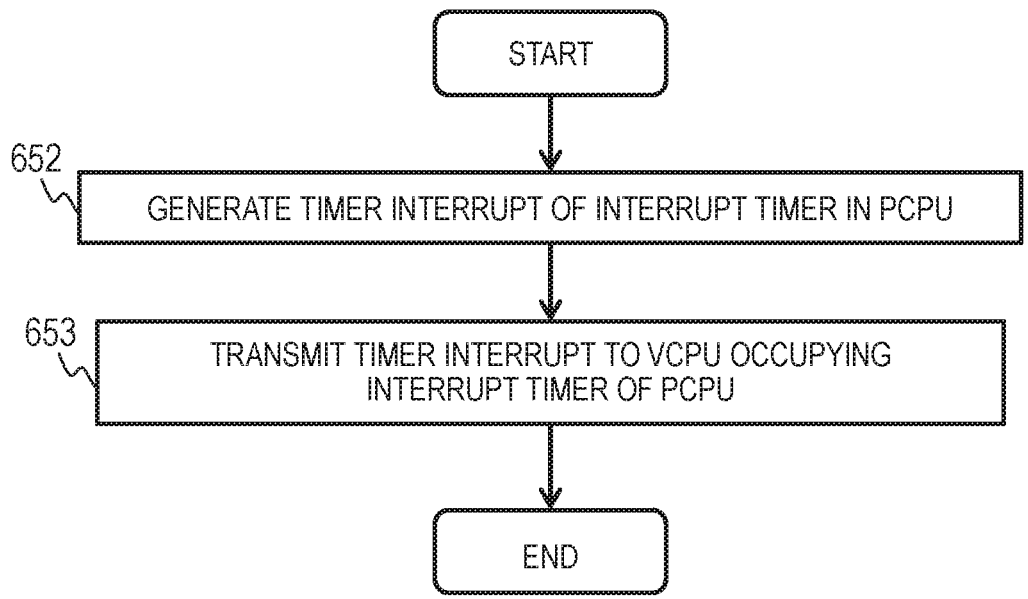
FIG. 9B is a flowchart for illustrating an example of the processing for delivering the timer interrupt of the interrupt timer of the virtual CPU on the physical CPU 10a in the exclusive timer mode according to the embodiment of this invention.

Next, the interrupt timer 40a of the physical CPU 0 (10a) of FIG. 4B is taken as an example to describe, with reference to the flowcharts of FIG. 9A and FIG. 9B, examples of the updating of the interrupt timer 230a of the virtual CPU 210a on the physical CPU 10a in the exclusive timer mode and the processing for delivering the timer interrupt to the virtual CPU 210a in conjunction with the timer interrupt issued from the interrupt controller 30a of the relevant physical CPU 10a.

FIG. 9A is a flowchart for illustrating an example of the processing for updating the remaining-time counter of the interrupt timer of the virtual CPU 210a on the physical CPU 10a in the exclusive timer mode.

FIG. 9B is a flowchart for illustrating an example of the processing for delivering the timer interrupt of the interrupt timer 230a of the virtual CPU 210a on the physical CPU 10a in the exclusive timer mode.

As illustrated in FIG. 4B, only the virtual CPU 0 (210a) of the virtual machine 1 (200a) is operating on the physical CPU 0 (10a). When the interrupt timer 40a of the physical CPU 0 (10a) is the exclusive timer mode, the virtual machine monitor 100 causes the guest operating system 201 operating on the virtual CPU 0 (210a) to recognize the state of the interrupt timer 40a as the state of the interrupt timer 230a of the virtual CPU 0 (210a) as it is.

In FIG. 9A, the guest operating system 201 operating on the virtual CPU 0 issues a request to write a value to the remaining-time counter 231a of the interrupt timer 230a (Step 650).

The timer management module 120 of the virtual machine monitor 100 traps the write request issued by the guest operating system 201, and writes the value of the remaining-time counter 231a directly to the remaining-time counter 41a of the interrupt timer 40a of the physical CPU 0 (10a) (Step 651).

As described above, in the exclusive timer mode, the value of the remaining-time counter 231a is written to the remaining-time counter 41a of the interrupt timer 40a of the physical CPU 0 (10a) as it is by the timer management module 120.

In FIG. 9B, when the value is written, the remaining-time counter 41a starts the decrementing at the cycle period of the frequency 42a. When the remaining-time counter 41a becomes zero after the repeated decrementing, the interrupt controller 30a generates the timer interrupt, and notifies the physical CPU 0 (10a) of the timer interrupt (Step 652). When receiving the timer interrupt, the virtual machine monitor 100 directly delivers the timer interrupt to the virtual CPU 0 (210a) (Step 653).

By the above-mentioned processing, on the physical CPU 10a in the exclusive timer mode, the timer management module 120 can directly notify the virtual CPU 210a of the timer interrupt generated by the interrupt controller 30a, and can execute the processing corresponding to the timer event.

Next, a specific description is made of processing for switching the interrupt timer of the relevant physical CPU 10 from the shared timer mode to the exclusive timer mode in conjunction with the switching from the shared CPU mode to the exclusive CPU mode for the physical CPU.

Figure 10A:
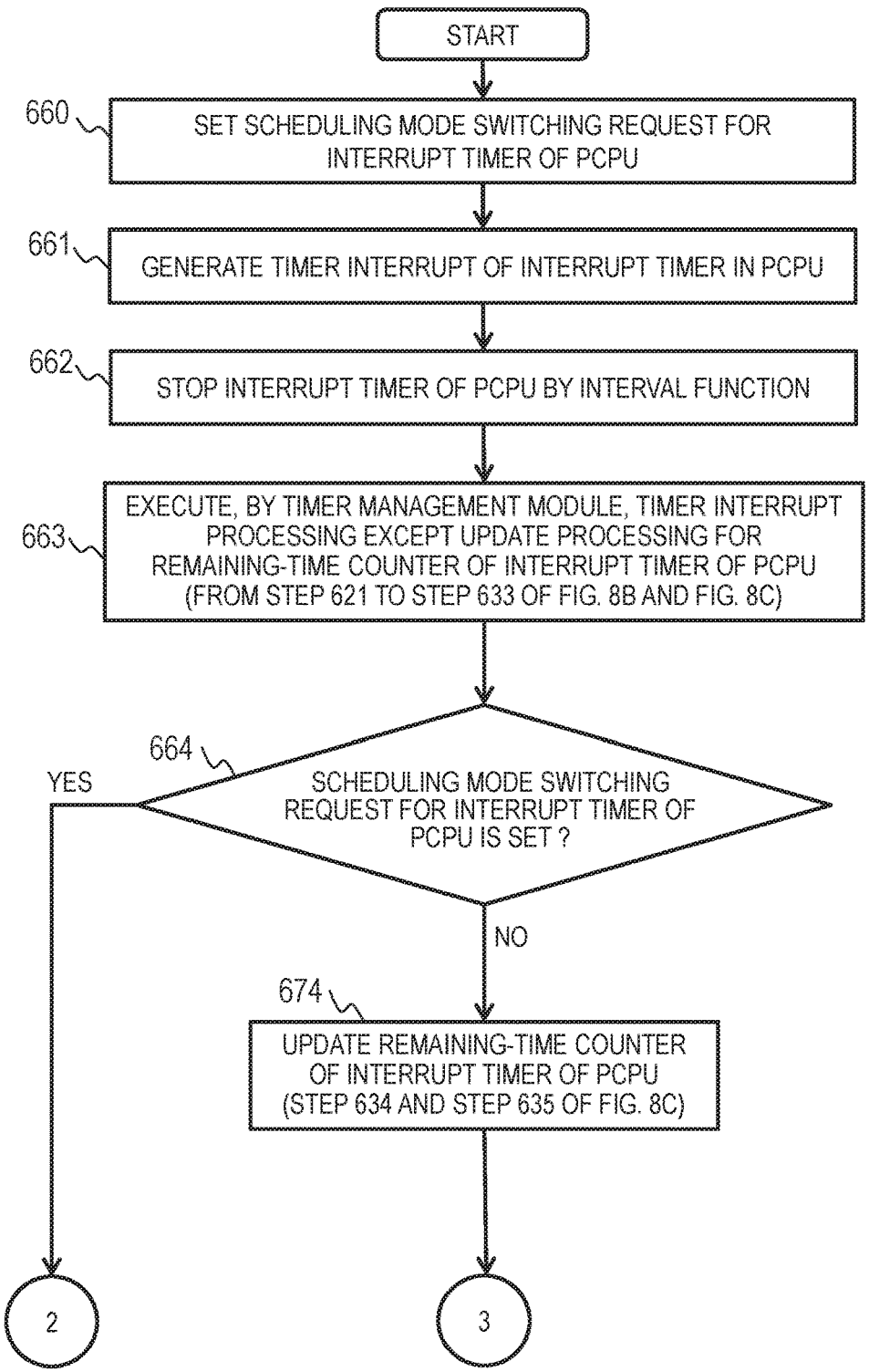
FIG. 10A is the first half of the flowchart for illustrating an example of the processing for dynamically changing the timer scheduling mode for the interrupt timer of the physical CPU according to the embodiment of this invention.
Figure 10B:
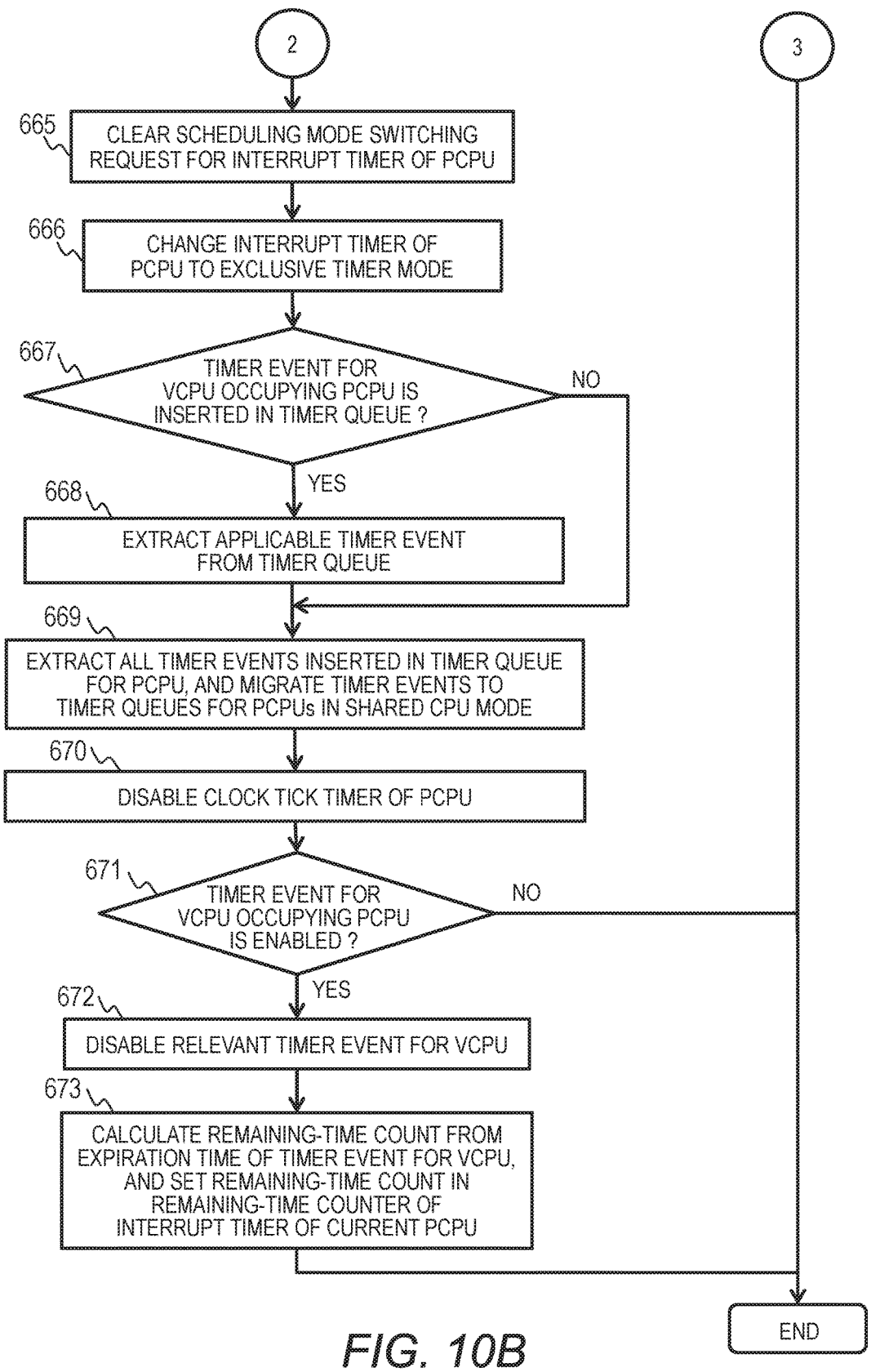
FIG. 10B is the second half of the flowchart for illustrating an example of the processing for dynamically changing the timer scheduling mode for the interrupt timer of the physical CPU according to the embodiment of this invention.

With reference to FIG. 10A and FIG. 10B, a description is made below of an example of switching the physical CPU 0 (10a) from the shared CPU mode (shared timer mode) to the exclusive CPU mode (exclusive timer mode) in conjunction with the switching from FIG. 4A to FIG. 4B.

FIG. 10A is the first half of the flowchart for illustrating an example of the processing for dynamically changing the timer scheduling mode 121 for the interrupt timer of the physical CPU 10a. FIG. 10B is the second half of the flowchart for the above-mentioned processing for dynamically changing the timer scheduling mode for the interrupt timer of the physical CPU.

In the shared CPU mode illustrated in FIG. 4A, the virtual CPU 0 (210a) of the virtual machine 1 (200a), the virtual CPU 0 (210a) of the virtual machine 2 (200b), and the host process 1 (150a) are operating on the physical CPU 0 (10a). Then, in FIG. 4B for illustrating the state after the switching to the exclusive CPU mode, the virtual CPU 0 (210a) of the virtual machine 2 (200b) and the host process 1 (150a) are migrated to the physical CPU 2 (10c).

In FIG. 10A, when the physical CPU 0 (10a) is switched from the shared CPU mode to the exclusive CPU mode, the virtual machine monitor 100 sets the scheduling mode switching request 123a for the interrupt timer 40a (Step 660).

When the count value of the timer event currently being counted by the interrupt timer 40a becomes zero, the interrupt controller 30a of the physical CPU 0 (10a) generates the timer interrupt. After the physical CPU 0 (10a) starts the exclusive CPU mode, the virtual machine monitor 100 receives, from the interrupt controller 30a, the timer interrupt generated when the interrupt timer 40a finishes the counting (Step 661).

A new value is not set after the occurrence of the interrupt, and hence the interrupt timer 40a of the physical CPU 0 (10a) stops the counting based on the above-mentioned interval timer function (Step 662).

The virtual machine monitor 100 activates the timer management module 120. The timer management module 120 executes the above-mentioned processing from Step 622 to Step 633 of FIG. 8B and FIG. 8C. However, the timer management module 120 does not execute the processing for updating the remaining-time counter 41a of the interrupt timer 40a of the physical CPU 10a (Step 663). The timer management module 120 executes the above-mentioned processing when the interrupt timer 40a is in the shared timer mode.

The state in which the interrupt timer 40a has stopped the counting is maintained through inhibition of the processing for updating the remaining-time counter 41a of the interrupt timer 40a of the physical CPU 10a.

The timer management module 120 determines whether or not the scheduling mode switching request 123a is set (Step 664). When the scheduling mode switching request 123a is set, the procedure advances to Step 665 of FIG. 10B, and when the scheduling mode switching request 123a is not set, advances to Step 674.

The timer management module 120 first clears the scheduling mode switching request 123a (Step 665). Subsequently, the timer management module 120 changes the timer scheduling mode 121a for the interrupt timer 40a to the exclusive timer mode (Step 666).

This inhibits the timer event from being migrated from the other physical CPUs 10b to 10d to the physical CPU 0 (10a).

Subsequently, the timer management module 120 determines whether or not the timer event 240a for the virtual CPU 0 (210a) occupying the physical CPU 0 (10a) is inserted in the timer queue 122a (Step 667). When the timer event 240a is inserted in the timer queue 122a, the timer management module 120 extracts the timer event 240a (Step 668).

Subsequently, the timer management module 120 migrates all the timer events inserted in the timer queue 122a to the physical CPUs 10b to 10d in the shared CPU mode (Step 669). In FIG. 4A, the timer event 240c for the virtual CPU 0 of the virtual machine 2 inserted in the timer queue 122a for the physical CPU 0 and the timer event 160a for the host process 1 are migrated to the timer queue 122c for the physical CPU 2 in the shared timer mode as illustrated in FIG. 4B.

Subsequently, the timer management module 120 disables the status 134a of the timer event 130a for the clock tick timer of the physical CPU 0 (10a) to stop the timer event 130a (Step 670).

The timer management module 120 then refers to the status 243a of the timer event 240a for the virtual CPU 0 (210a) of the virtual machine 1 (200a), which has been extracted from the timer queue 122a in Step 668, to determine whether or not the status 243a is enabled (Step 671). When the status 243a is enabled, the procedure advances to Step 671, and when the status 243a is disabled, the processing is brought to an end.

The timer management module 120 sets the status 243a of the timer event 240a to "disabled" (Step 672).

Subsequently, the timer management module 120 acquires the current time from the system time counter 81 of the system time 80, and converts the expiration time 242a of the timer event 240a into the remaining-time count based on Expression D described below.

$$\text{(Remaining-time count)} = ((\text{expiration time } (242a)) - (\text{current time})) \times (\text{timer frequency } (42a))/(\text{system time frequency } (82))) \quad \text{(Expression D)}$$

Then, the timer management module 120 sets the remaining-time count calculated in the above-mentioned manner in the remaining-time counter 41a of the interrupt timer 40a (Step 673), and starts the occupancy of the interrupt timer 40a of the physical CPU 0 (10a) by the interrupt timer 230a of the virtual CPU 0 (210a).

Meanwhile, when it is determined above in Step 664 that the scheduling mode switching request 123a is not set, the timer management module 120 executes the above-mentioned processing of Step 634 and Step 635 of FIG. 8C, and brings the processing to an end (Step 674). Specifically, the timer management module 120 updates the remaining-time counter 41a of the interrupt timer 40a of the physical CPU 10a, and brings the processing to an end.

By the above-mentioned processing, the scheduling mode for the interrupt timer 40a can be dynamically switched from the shared timer mode to the exclusive timer mode in conjunction with the shift of the physical CPU 0 (10a) in the shared CPU mode to the exclusive CPU mode.

In this case, the interrupt timer 40a has an interval function of stopping the counting when a new value is not set after the timer finishes the counting. In this embodiment, after the interrupt timer 40a finishes the counting and the interrupt controller 30a generates the timer interrupt, the scheduling mode is shifted from the shared timer mode to the exclusive timer mode with the interrupt timer 40a being in a stopped state. This allows the scheduling mode for the interrupt timer 40a to be dynamically changed after the timer event for which the counting has already been started is positively completed.

In the exclusive timer mode for the interrupt timer 40a, the timer event 240a for the virtual CPU 0 (210a) set in the shared mode is disabled in Step 672 described above, and hence the interrupt timer 40a maintains the state in which the counting is stopped.

Figure 10C:
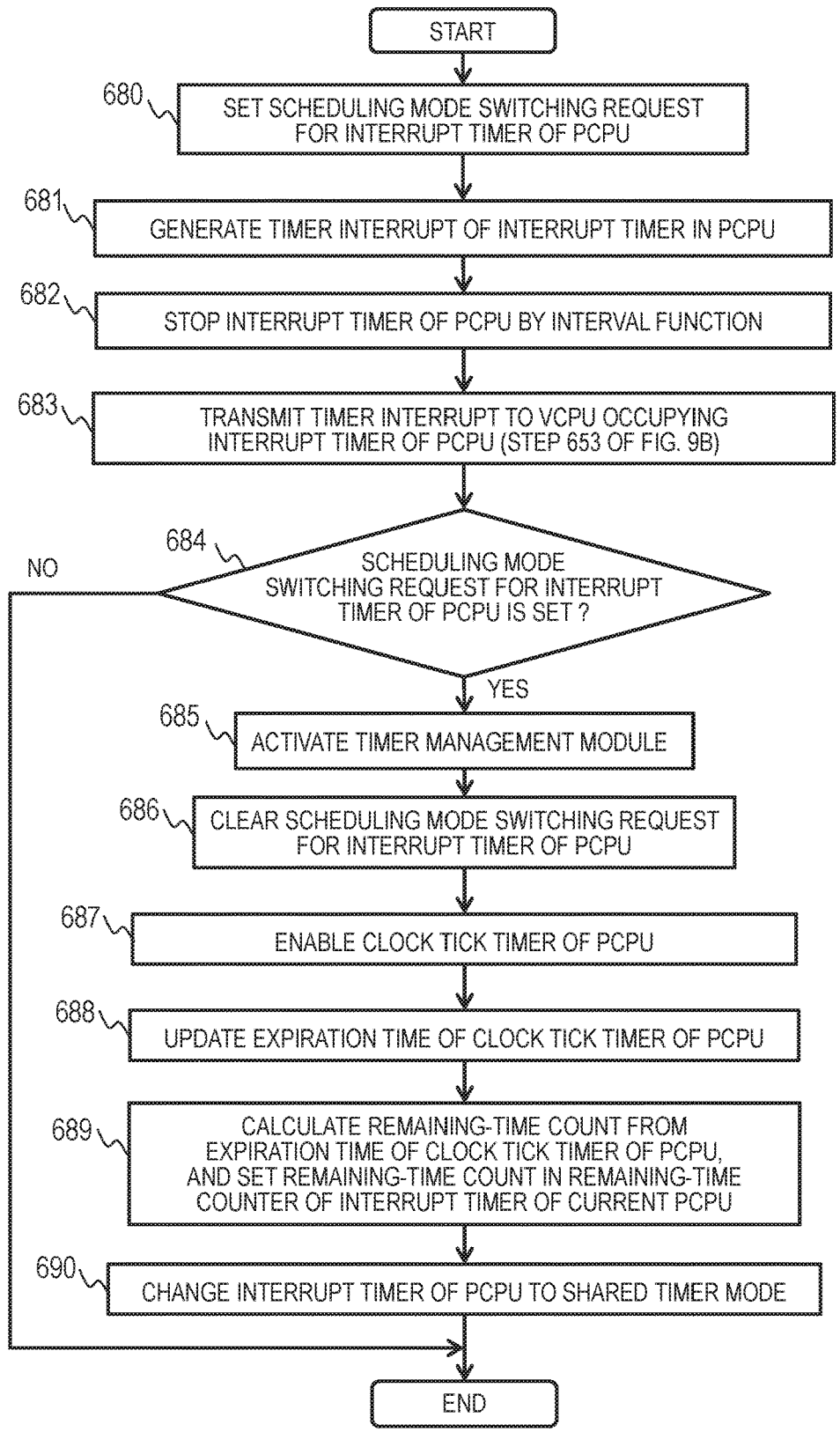
FIG. 10C is a flowchart for illustrating the processing for dynamically changing the timer scheduling mode for the interrupt timer of the physical CPU.

Next, a specific description is made of processing for switching the interrupt timer 40 of the relevant physical CPU 10 from the exclusive timer mode to the shared timer mode in conjunction with the switching from the exclusive CPU mode to the shared CPU mode for the physical CPU 10. This processing is described with reference to the flowchart of FIG. 10C by taking the physical CPU 0 (10a) as an example in the switching from FIG. 4B to FIG. 4A. FIG. 10C is a flowchart for illustrating the processing for dynamically changing the timer scheduling mode 121 for the interrupt timer 40 of the physical CPU 10.

When the physical CPU 0 (10a) is changed from the exclusive CPU mode to the shared CPU mode, the virtual CPU 0 (210a) of the virtual machine 1 (200a) stops the occupancy of the physical CPU 0 (10a). In the subsequent processing, an arbitrary virtual CPU 210 and an arbitrary host process 150 can operate on the physical CPU 0 (10a).

The above description relates to an example in which the virtual CPU 0 (210a) of the virtual machine 2 (200b) and the host process 1 (150a) are returned to the physical CPU 0 (10a) thereafter based on the load balancing.

In FIG. 10C, when the physical CPU 0 (10a) is switched from the exclusive CPU mode to the shared CPU mode, the virtual machine monitor 100 sets the scheduling mode switching request 123a for the interrupt timer 40a (Step 680).

When the count value of the timer event (for the remaining-time counter 41a) currently being counted by the interrupt timer 40a becomes zero, the interrupt controller 30a of the physical CPU 0 (10a) generates the timer interrupt. After the physical CPU 0 (10a) finishes the exclusive CPU mode, the virtual machine monitor 100 receives, from the interrupt controller 30a, the timer interrupt generated when the interrupt timer 40a finishes the counting (Step 681).

A new value is not set after the occurrence of the interrupt, and hence the interrupt timer 40a of the physical CPU 0 (10a) stops the counting based on the above-mentioned interval function (Step 682).

The virtual machine monitor 100 directly delivers the timer interrupt to the virtual CPU 0 (210a) in the same manner as in Step 653 illustrated in FIG. 9B (Step 683). Subsequently, the virtual machine monitor 100 determines whether or not the scheduling mode switching request 123a for the interrupt timer 40a of the physical CPU 0 (10a) is set (Step 684). When the scheduling mode switching request 123a is set, the procedure advances to Step 685, and when the scheduling mode switching request 123a is not set, brings the processing to an end.

The virtual machine monitor 100 activates the timer management module 120 (Step 685). The timer management module 120 clears the scheduling mode switching request 123a (Step 686).

Subsequently, the timer management module 120 enables the status 134a of the timer event 130a for the clock tick timer of the physical CPU 0 (10a) to restart the timer event 130a (Step 687).

Then, the timer management module 120 updates the expiration time 132a of the timer event 130a based on (Expression A) described above (Step 688). At this point in time, the enabled timer event for the physical CPU 0 (10a) is only the timer event 130a for the clock tick timer. Therefore, the current time acquired by reading the system time counter 81 of the system time 80 is subtracted from the expiration time 132a, to thereby calculate the remaining-time count. The timer management module 120 sets the value calculated from the remaining-time count by (Expression B) described above in the remaining-time counter 41a of the interrupt timer 40a of the physical CPU 0 (10a) (Step 689).

Here, the timer event 240a for the virtual CPU 0 (210a) of the virtual machine 1 (200a) that was occupying the physical CPU 0 (10a) before is disabled in Step 672 described above.

Finally, the timer management module 120 changes the timer scheduling mode 121a for the interrupt timer 40a of the physical CPU 0 (10a) to the shared timer mode, and finishes the occupancy of the interrupt timer 40a of the physical CPU 0 (10a) by the interrupt timer 230a of the virtual CPU 0 (210a) (Step 690).

By the above-mentioned processing, the scheduling mode of the interrupt timer 40a can be dynamically switched from the exclusive timer mode to the shared timer mode in conjunction with the shift of the physical CPU 0 (10a) in the exclusive CPU mode to the shared CPU mode.

In the same manner as in the above-mentioned dynamic switching from the shared timer mode to the exclusive timer mode, the interval function of the interrupt timer 40a is used to dynamically switch the scheduling mode from the exclusive timer mode to the shared timer mode. This allows the scheduling mode for the interrupt timer 40a to be dynamically changed after the timer event for which the counting has already been started is positively completed.

As described above, according to this embodiment, the interrupt timer 230 of a specific virtual CPU 210 is allowed to occupy the interrupt timer 40 of the physical CPU 10 in conjunction with the occupancy of the physical CPU 10 by the virtual CPU 210. With this configuration, the overhead of the emulation of the interrupt timer of the virtual CPU can be minimized, and data eviction from a TLB or a cache by a timer for a host, which has occurred irrespective of whether or not a program on the virtual CPU is operating, can be suppressed to ensure the performance of the physical CPU.

Further, in this embodiment, the timer scheduling mode is dynamically switched between the exclusive timer mode and the shared timer mode in conjunction with the CPU scheduling mode through use of the interval function of the interrupt timer 40a, which inhibits the operation from being conducted after the interrupt controller 30a generates the timer interrupt and before a value is written to the remaining-time counter of the interrupt timer 40a.

In regard to the switching of the timer scheduling mode in conjunction with the CPU scheduling mode, the shared timer mode is set in conjunction with the shared CPU mode, and the exclusive timer mode is set in conjunction with the exclusive CPU mode.

In the switching from the shared timer mode to the exclusive timer mode, the clock tick timer that was using the relevant interrupt timer 40a is stopped, and the timer event 160a for the host process 1 that was using the interrupt timer of the physical CPU and the timer event for a timer for detecting a timeout or the like are migrated to another physical CPU in the shared CPU mode. Finally, the current value of the remaining-time counter 231a of the interrupt timer 230 of the above-mentioned virtual CPU 210 is written to the remaining-time counter 41a of the interrupt timer 40a of the physical CPU 10a, to thereby start the occupancy of the interrupt timer 40a of the physical CPU 10a by the interrupt timer 230a of the virtual CPU 210.

While the interrupt timer 230a of the virtual CPU 210a occupies the interrupt timer 40a of the physical CPU 10a, the program on the virtual CPU 210 writes a value to the remaining-time counter 231a of the interrupt timer 230a. The relevant write request is trapped by the virtual machine monitor 100. The virtual machine monitor 100 writes a write value directly to the remaining-time counter 41a of the interrupt timer 40a of the physical CPU 10a. The interrupt timer 40a of the physical CPU 10a starts the decrementing after the write value is written to the remaining-time counter 41a, and when the write value become zero, the interrupt controller 30a generates the timer interrupt.

Further, in the exclusive timer mode, the timer event 130 for the clock tick timer and the timer event 240a for the virtual CPU 210a are disabled, and hence it is possible to ensure the performance of the physical CPU 10 by inhibiting the occurrence of the timer interrupt to prevent data eviction from the TLB or the cache.

Further, in the exclusive timer mode, at least one physical CPU 10 is set to the shared timer mode. This allows the timer event 160 of the host process 150 or the timer event 130a for the clock tick timer to be correctly executed, and allows the timer for detecting a timeout, the clock tick timer, or the like to be continuously operated.

Meanwhile, the dynamic switching of the physical CPU 10a from the exclusive CPU mode to the shared CPU mode also involves the use of the stopping of the counting based on the interval function after the interrupt controller 30a generates the timer interrupt when the interrupt timer 40a of the physical CPU 10a finishes the counting.

When receiving the timer interrupt from the interrupt controller 30a of the physical CPU 10a, the virtual machine monitor 100 directly delivers the timer interrupt to the virtual CPU 210. The virtual machine monitor 100 sets the remaining-time counter 231a of the interrupt timer 230a of the virtual CPU 210 to zero to stop the interrupt timer 230a. The virtual machine monitor 100 restarts the timer event 130a for the clock tick timer, which was using the interrupt timer 40a of the physical CPU 10a, to allow the physical CPU 10a to process the timers for activating the host process 1 and detecting a timeout and the interrupt timer 40 of another virtual CPU, and finishes the occupancy of the interrupt timer 40a of the physical CPU 10a by the interrupt timer 230 of the virtual CPU 210.

In the virtual machine system, the interrupt timer 40 of at least one physical CPU 10 is inhibited from being occupied by the interrupt timer 230 of a specific virtual CPU 210, to thereby allow the timers for activating the host process and detecting a timeout to be continuously operated through the use of the interrupt timer 40 of the physical CPU 10.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A method of controlling a virtual machine system, the virtual machine system comprising:
   a physical computer comprising a plurality of physical processors and a physical memory, at least one of the physical processors including an interrupt controller, and the interrupt controller including an interrupt timer, the memory storing instructions that cause the physical processors to execute a virtualization module configured to allocate a computer resource of the physical computer to a plurality of virtual machines and to control allocation of the physical processors, the method comprising:
   a first step of generating, by the virtualization module, the plurality of virtual machines by respectively generating for each of the virtual machines:
      a virtual processor comprising a virtual interrupt timer obtained by virtualizing the interrupt timer and a virtual interrupt controller obtained by virtualizing the interrupt controller to which the computer resource of the physical processors is allocated; and
      a virtual memory to which the computer resource of the physical memory is allocated;
   a second step of setting, by the virtualization module, a processor scheduling mode to any one of:
      a shared processor mode in which one of the physical processors allocated to the plurality of virtual machines is shared among a plurality of the virtual processors; and
      an exclusive processor mode in which one of the physical processors allocated to the plurality of virtual machines is occupied by a specific virtual processor; and
   a third step of setting, by the virtualization module, in conjunction with the processor scheduling mode, a timer scheduling mode to any one of:
      a shared timer mode in which the interrupt timer of the one of the physical processors for which any one of the shared processor mode and the exclusive processor mode is set is shared among timer events for the plurality of virtual machines; and
      an exclusive timer mode in which the interrupt timer of the one of the physical processors is occupied by a virtual timer of the specific virtual processor,
   wherein, on the one of the physical processors in the shared timer mode, the virtualization module receiving a timer event of a timer interrupt generated by the interrupt controller of the one of the physical processors, and, when the timer event is for at least one of the plurality of virtual machines, notifying the at least one of the plurality of virtual machines corresponding to the timer event, and causing the at least one of the virtual machines to execute a predetermined processing corresponding to the timer event, and wherein, on the one of the physical processors in the exclusive timer mode, the virtualization module directly notifying the specific virtual processor of a timer interrupt generated by the interrupt controller of the one of the physical processors, and causing the specific virtual processor to execute a predetermined processing corresponding to the timer interrupt.

2. The method of controlling a virtual machine system according to claim 1, further comprising:
   a fourth step of switching, by the virtualization module, the processor scheduling mode for the physical processors between the shared processor mode and the exclusive processor mode; and
   a fifth step of switching, by the virtualization module, the timer scheduling mode in conjunction with the processor scheduling mode.

3. The method of controlling a virtual machine system according to claim 2, wherein:
   the second step comprises setting one of the physical processors allocated to the plurality of virtual machines to the shared processor mode in which the one of the physical processors is shared among the plurality of the virtual processors;
   the third step comprises setting the interrupt timer of the one of the physical processors to the shared timer mode in which the interrupt timer is shared among the timer events for the plurality of virtual machines in conjunction with the processor scheduling mode being the shared processor mode;

the fourth step comprises switching the processor scheduling mode for the one of the physical processors from the shared processor mode to the exclusive processor mode; and the fifth step comprises switching the timer scheduling mode from the shared timer mode to the exclusive timer mode in conjunction with the processor scheduling mode.

4. The method of controlling a virtual machine system according to claim 2, wherein:

the second step comprises setting one of the physical processors allocated to the plurality of virtual machines to the exclusive processor mode in which the one of the physical processors is occupied by the specific virtual processor;

the third step comprises setting the interrupt timer of the one of the physical processors to the exclusive timer mode in which the interrupt timer is occupied by the virtual timer of the specific virtual processor in conjunction with the processor scheduling mode being the exclusive processor mode;

the fourth step comprises switching the processor scheduling mode for the one of the physical processosr from the exclusive processor mode to the shared processor mode; and the fifth step comprises switching the timer scheduling mode from the exclusive timer mode to the shared timer mode in conjunction with the processor scheduling mode.

5. The method of controlling a virtual machine system according to claim 3, wherein the fifth step further comprises switching the timer event, which was set for the interrupt timer of the one of the physical processors in the shared timer mode, to the exclusive timer mode after migrating the timer event to another one of the physical processors set in the shared timer mode.

6. The method of controlling a virtual machine system according to claim 3, wherein:

the interrupt controller of the one of the physical processors stops counting until a new value is written to the interrupt timer after an occurrence of a timer interrupt; and the fifth step further comprises executing the switching of the timer scheduling mode from the shared timer mode to the exclusive timer mode after the interrupt controller of the one of the physical processors to be switched from the shared timer mode to the exclusive timer mode generates the timer interrupt.

7. The method of controlling a virtual machine system according to claim 3, wherein:

in the shared processor mode, a clock tick timer configured to generate a timer interrupt at a predetermined cycle period in order to time-divisionally share the physical processors among the plurality of the virtual processors is included in the timer event; and the fifth step further comprises executing the switching of the timer scheduling mode from the shared timer mode to the exclusive timer mode after the timer event for the clock tick timer of the interrupt timer of the one of the physical processors to be switched from the shared timer mode to the exclusive timer mode is disabled.

8. A virtual machine system, comprising:

a physical computer comprising a plurality of physical processors and a physical memory, at least one of the physical processors including an interrupt controller, and the interrupt controller including an interrupt timer, wherein the memory stores instructions that cause the physical processors to execute a virtualization module configured to allocate a computer resource of the physical computer to a plurality of virtual machines, wherein the virtualization module is configured to:

generate the plurality of virtual machines each comprising:

a virtual processor comprising a virtual interrupt timer obtained by virtualizing the interrupt timer and a virtual interrupt controller obtained by virtualizing the interrupt controller to which the computer resource of the physical processors is allocated; and a virtual memory to which the computer resource of the physical memory is allocated;

set a processor scheduling mode to any one of:

a shared processor mode in which one of the physical processors allocated to the plurality of virtual machines is shared among a plurality of the virtual processors; and an exclusive processor mode in which one of the physical processors allocated to the plurality of virtual machines is occupied by a specific virtual processor; and set, in conjunction with the processor scheduling mode, a timer scheduling mode to any one of:

a shared timer mode in which the interrupt timer of the one of the physical processors for which any one of the shared processor mode and the exclusive processor mode is set is shared among timer events for the plurality of virtual machines; and an exclusive timer mode in which the interrupt timer of the one of the physical processors is occupied by a virtual timer of the specific virtual processor, wherein, on the one of the physical processors in the shared timer mode, the virtualization module receives a timer event of a timer interrupt generated by the interrupt controller of the one of the physical processors, and, when the timer event is for at least one of the plurality of virtual machines, notifies the at least one of the plurality of virtual machines corresponding to the timer event, and causes the at least one of the virtual machines to execute a predetermined processing corresponding to the timer event, and wherein, on the one of the physical processors in the exclusive timer mode, the virtualization module directly notifies the specific virtual processor of a timer interrupt generated by the interrupt controller of the one of the physical processors, and causes the specific virtual processor to execute a predetermined processing corresponding to the timer interrupt.

9. The virtual machine system according to claim 8, wherein the virtualization module is configured to:

switch the processor scheduling mode for the physical processors between the shared processor mode and the exclusive processor mode; and switch the timer scheduling mode in conjunction with the processor scheduling mode.

10. The virtual machine system according to claim 9, wherein the virtualization module is configured to:

set one of the physical processors allocated to the plurality of virtual machines to the shared processor mode in which the one of the physical processors is shared among the plurality of the virtual processors;

set the interrupt timer of the one of the physical processors to the shared timer mode in which the interrupt timer is shared among the timer events for the plurality of virtual machines in conjunction with the processor scheduling mode being the shared processor mode;

switch the processor scheduling mode for the one of the physical processors from the shared processor mode to the exclusive processor mode; and switch the timer scheduling mode from the shared timer mode to the exclusive timer mode in conjunction with the processor scheduling mode.

11. The virtual machine system according to claim 9, wherein the virtualization module is configured to:

set one of the physical processors allocated to the plurality of virtual machines to the exclusive processor mode in which the one of the physical processors is occupied by the specific virtual processor;

set the interrupt timer of the one of the physical processors to the exclusive timer mode in which the interrupt timer is occupied by the virtual timer of the specific virtual processor in conjunction with the processor scheduling mode being the exclusive processor mode;

switch the processor scheduling mode for the one of the physical processors from the exclusive processor mode to the shared processor mode; and switch the timer scheduling mode from the exclusive timer mode to the shared timer mode in conjunction with the processor scheduling mode.

12. The virtual machine system according to claim 10, wherein the virtualization module is configured to switch the timer event, which was set for the interrupt timer of the one of the physical processors in the shared timer mode, to the exclusive timer mode after migrating the timer event to another one of the physical processors set in the shared timer mode.

13. The virtual machine system according to claim 10, wherein:

the interrupt controller of the one of the physical processors stops counting until a new value is written to the interrupt timer after an occurrence of a timer interrupt; and the switching of the timer scheduling mode from the shared timer mode to the exclusive timer mode is executed after the interrupt controller of the one of the physical processors to be switched from the shared timer mode to the exclusive timer mode generates the timer interrupt.

14. The virtual machine system according to claim 10, wherein:

in the shared processor mode, a clock tick timer configured to generate a timer interrupt at a predetermined cycle period in order to time-divisionally share the physical processors among the plurality of the virtual processors is included in the timer event; and the switching of the timer scheduling mode from the shared timer mode to the exclusive timer mode is executed after the timer event for the clock tick timer of the interrupt timer of the one of the physical processors to be switched from the shared timer mode to the exclusive timer mode is disabled.

* * * * *